United States Patent
Lee

(10) Patent No.: US 12,461,665 B2
(45) Date of Patent: Nov. 4, 2025

(54) STORAGE DEVICE INCLUDING REPLAY PROTECTED MEMORY BLOCK (RPMB) HOST DEVICE ACCESSING THE RPMB, ELECTRONIC DEVICE INCLUDING STORAGE DEVICE AND HOST DEVICE, AND METHOD OF OPERATING THE SAME

(71) Applicant: SK hynix Inc., Icheon-si (KR)

(72) Inventor: Hui Won Lee, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 17/468,480

(22) Filed: Sep. 7, 2021

(65) Prior Publication Data

US 2022/0091760 A1  Mar. 24, 2022

(30) Foreign Application Priority Data

Sep. 22, 2020 (KR) .................. 10-2020-0122028
Aug. 11, 2021 (KR) .................. 10-2021-0106006

(51) Int. Cl.
*G06F 3/06* (2006.01)
*H04L 9/32* (2006.01)

(52) U.S. Cl.
CPC .......... *G06F 3/0623* (2013.01); *G06F 3/064* (2013.01); *G06F 3/0659* (2013.01); *G06F 3/0679* (2013.01); *H04L 9/3242* (2013.01)

(58) Field of Classification Search
None
See application file for complete search history.

(56) References Cited

U.S. PATENT DOCUMENTS

| | | | | |
|---|---|---|---|---|
| 10,491,569 B1 * | 11/2019 | Powell, III | .......... | H04L 61/2596 |
| 2015/0350206 A1 * | 12/2015 | Shin | .................... | H04L 63/0876 |
| | | | | 713/170 |
| 2016/0034683 A1 | 2/2016 | Lee et al. | | |
| 2016/0226622 A1 | 8/2016 | Kasher et al. | | |
| 2016/0379015 A1 * | 12/2016 | Samsonov | .............. | G06F 21/64 |
| | | | | 713/193 |

(Continued)

FOREIGN PATENT DOCUMENTS

| | | |
|---|---|---|
| CN | 101019364 A | 8/2007 |
| CN | 110088759 A | 8/2019 |
| CN | 110096908 A | 8/2019 |

(Continued)

OTHER PUBLICATIONS

AH and ESP protocols (Year: 2021).*

(Continued)

*Primary Examiner* — Rocio Del Mar Perez-Velez
*Assistant Examiner* — Marwan Ayash
(74) *Attorney, Agent, or Firm* — Perkins Coie LLP

(57) ABSTRACT

Storage devices, host devices and electronic devices are disclosed. In an embodiment of the disclosed technology, an electronic device providing an improved security function may include a storage device including a replay protected memory block (RPMB), and a host device configured to provide a command protocol information unit (PIU) instructing the storage device to access the RPMB. The command PIU may include a basic header segment including a total extra header segment length field having a value other than 0 and an extra header segment including a host RPMB message.

24 Claims, 27 Drawing Sheets

RPMB Message Components

| Component Name | Length | Request | Response | Description |
|---|---|---|---|---|
| Request Message Type | 2 bytes | Yes | Yes | This component indicates the request message type |
| Response Message Type | 2 bytes | No | Yes | This component indicates the response message type |
| Authentication Key | 32 bytes | Yes | No | This component is used only when programming the Authentication Key |
| MAC | 32 bytes | Yes | Yes | Message Authentication Code |
| Result | 2 bytes | No | Yes | This component provides the operation result |
| Write Counter | 4 bytes | Yes | Yes | Total amount of successful authenticated data write operations |
| Address | 2 bytes | Yes | Yes | Logical block address of data to be programmed to or read from the RPMB region |
| Nonce | 16 bytes | Yes | Yes | Random number generated by the host for the requests and copied to response by the RPMB engine |
| Data | 256 bytes | Yes | Yes | Data to be written or read by signed access |
| Advanced RPMB Data | 4KB | Yes | Yes | Data to be written or read by signed access in advanced RPMB operation |
| Block Count | 2 bytes | Yes | Yes | Number of 256-byte logical blocks requested to be read or programmed |
| Advanced RPMB Block Count | 2 bytes | Yes | Yes | Number of 4Kbytes (advanced RPMB data) requested to be read or programmed |

(56) References Cited

U.S. PATENT DOCUMENTS

2021/0026542 A1* 1/2021 Carlson ................ G06F 3/0688
2021/0034296 A1* 2/2021 Park ..................... G06F 3/0659

FOREIGN PATENT DOCUMENTS

| KR | 101989018 B1 | 6/2019 |
| KR | 20190099693 A | 8/2019 |
| KR | 20200027982 A | 3/2020 |
| TW | 201820132 A | 6/2018 |

OTHER PUBLICATIONS

First Office Action for CN Appl. No. 202110537808.3, mailed on Apr. 25, 2025, 21 pages with English translation.
Notice of Office Action for TW Appl. No. 110134839, mailed on Jul. 7, 2025, 24 pages with English translation.

* cited by examiner

| Basic Header Segment (61) | | | |
|---|---|---|---|
| Transaction Type | Flags | LUN | Task Tag |
| Initiator ID | Command Set Type | Query Function, Task Manag. Function | Response | Status |
| Total EHS Length | Device Information | Data Segment Length | |

FIG. 6

RPMB Message Components

| Component Name | Length | Request | Response | Description |
|---|---|---|---|---|
| Request Message Type | 2 bytes | Yes | Yes | This component indicates the request message type |
| Response Message Type | 2 bytes | No | Yes | This component indicates the response message type |
| Authentication Key | 32 bytes | Yes | No | This component is used only when programming the Authentication Key |
| MAC | 32 bytes | Yes | Yes | Message Authentication Code |
| Result | 2 bytes | No | Yes | This component provides the operation result |
| Write Counter | 4 bytes | Yes | Yes | Total amount of successful authenticated data write operations |
| Address | 2 bytes | Yes | Yes | Logical block address of data to be programmed to or read from the RPMB region |
| Nonce | 16 bytes | Yes | Yes | Random number generated by the host for the requests and copied to response by the RPMB engine |
| Data | 256 bytes | Yes | Yes | Data to be written or read by signed access |
| Advanced RPMB Data | 4KB | Yes | Yes | Data to be written or read by signed access in advanced RPMB operation |
| Block Count | 2 bytes | Yes | Yes | Number of 256-byte logical blocks requested to be read or programmed |
| Advanced RPMB Block Count | 2 bytes | Yes | Yes | Number of 4Kbytes (advanced RPMB data) requested to be read or programmed |

FIG. 9

RPMB Message of Authenticated Data Write Request

| Offset | Field Name | Value |
|---|---|---|
| 0:195 | Stuff Bytes | 0...00h |
| 196:227 | MAC | MAC from the host |
| 228:483 | Data | Data |
| 484:499 | Nonce | 0...00h |
| 500:503 | Write Counter | Current Counter value |
| 504:505 | Address | Address |
| 506:507 | Block Count | Number of 256B blocks |
| 508:509 | Result | 0000h |
| 510:511 | Request Message Type | 0003h |

AUTHENTICATED DATA: offsets 0:195, 196:227, 228:483
METADATA: offsets 484:499, 500:503, 504:505, 506:507, 508:509, 510:511

FIG. 10

RPMB Message of Result Read Request

| Offset | Field Name | Value |
|---|---|---|
| 0:195 | Stuff Bytes | 0...00h |
| 196:227 | MAC | 0...00h |
| 228:483 | Data | 0...00h |
| 484:499 | Nonce | 0...00h |
| 500:503 | Write Counter | 0...00h |
| 504:505 | Address | 0000h |
| 506:507 | Block Count | 0000h |
| 508:509 | Result | 0000h |
| 510:511 | Request Message Type | 0005h |

AUTHENTICATED DATA: offsets 0:195, 196:227, 228:483
METADATA: offsets 484:499, 500:503, 504:505, 506:507, 508:509, 510:511

FIG. 11

RPMB Message of Result Read Response

| | Offset | Field Name | Value |
|---|---|---|---|
| | 0:195 | Stuff Bytes | 0...00h |
| AUTHENTICATED DATA { | 196:227 | MAC | MAC from the storage device |
| METADATA { | 228:483 | Data | 0...00h |
| | 484:499 | Nonce | 0...00h |
| | 500:503 | Write Counter | New Counter value |
| | 504:505 | Address | Address |
| | 506:507 | Block Count | 0000h |
| | 508:509 | Result | Result Code |
| | 510:511 | Response Message Type | 0300h |

FIG. 13

RPMB Message of Authenticated Data Read Request

| | Offset | Field Name | Value |
|---|---|---|---|
| AUTHENTICATED DATA | 0:195 | Stuff Bytes | 0...00h |
| | 196:227 | MAC | 0...00h |
| | 228:483 | Data | 0...00h |
| METADATA | 484:499 | Nonce | Nonce from the host |
| | 500:503 | Write Counter | 0...00h |
| | 504:505 | Address | Address |
| | 506:507 | Block Count | Number of 256B blocks |
| | 508:509 | Result | 0000h |
| | 510:511 | Request Message Type | 0004h |

FIG. 14

RPMB Message of Authenticated Data Read Response

| | Offset | Field Name | Value |
|---|---|---|---|
| AUTHENTICATED DATA | 0:195 | Stuff Bytes | 0...00h |
| | 196:227 | MAC | MAC from the storage device |
| | 228:483 | Data | Data |
| METADATA | 484:499 | Nonce | Copy of the Nonce |
| | 500:503 | Write Counter | 0...00h |
| | 504:505 | Address | Address |
| | 506:507 | Block Count | Number of 256B blocks |
| | 508:509 | Result | Result Code |
| | 510:511 | Response Message Type | 0400h |

FIG. 15

| | | Command PIU | | |
|---|---|---|---|---|
| Basic Header Segment | 0 Transaction Type | 1 Flags | 2 LUN | 3 Task Tag |
| | 4 Initiator ID \| Command Set Type | 5 Reserved | 6 Reserved | 7 Reserved |
| | 8 Total EHS Length =non-zero | 9 Reserved | 10 (MSB) Data Segment Length | 11 (LSB) |
| Transaction Specific Fields | 12 (MSB) | 13 Expected Data Transfer Length | 14 | 15 (LSB) |
| | 16 CDB[0] | 17 CDB[1] | 18 CDB[2] | 19 CDB[3] |
| | 20 CDB[4] | 21 CDB[5] | 22 CDB[6] | 23 CDB[7] |
| | 24 CDB[8] | 25 CDB[9] | 26 CDB[10] | 27 CDB[11] |
| | 28 CDB[12] | 29 CDB[13] | 30 CDB[14] | 31 CDB[15] |
| Extra Header Segment | k | k+1 Extra Header Segment (EHS) 1 | k+2 | k+3 |
| | ⋮ | | | |
| | j | j+1 Extra Header Segment (EHS) N | j+2 | j+3 |
| Data Segment | Header E2ECRC (omit if HD=0) | | | |
| | Data Segment | | | |
| | Data E2ECRC (omit if DD=0) | | | |

FIG. 16

| | | | | |
|---|---|---|---|---|
| | \multicolumn{4}{c|}{Response PIU} | | | |

| Section | 0 Transaction Type | 1 Flags | 2 LUN | 3 Task Tag |
|---|---|---|---|---|
| Basic Header Segment | 4 Initiator ID \| Command Set Type | 5 Reserved | 6 Reserved | 7 Reserved |
| | 8 Total EHS Length =non-zero | 9 Reserved | 10 (MSB) Data Segment Length | 11 (LSB) |
| Transaction Specific Fields | 12 (MSB) Residual Transfer Count | 13 | 14 | 15 (LSB) |
| | 16 Reserved | 17 | 18 | 19 |
| | 20 Reserved | 21 | 22 | 23 |
| | 24 Reserved | 25 | 26 | 27 |
| | 28 Reserved | 29 | 30 | 31 |
| Extra Header Segment | k Extra Header Segment (EHS) 1 | k+1 | k+2 | k+3 |
| | ⋮ | | | |
| | j Extra Header Segment (EHS) N | j+1 | j+2 | j+3 |
| | \multicolumn{4}{c|}{Header E2ECRC (omit if HD=0)} | | | |
| Data Segment | k (MSB) Sense Data Length | k+1 (LSB) | k+2 Sense Data[0] | k+3 Sense Data[1] |
| | ⋮ | ⋮ | ⋮ | ⋮ |
| | k+16 Sense Data[14] | k+17 Sense Data[15] | k+18 Sense Data[16] | k+19 Sense Data[17] |
| | \multicolumn{4}{c|}{Data E2ECRC (omit if DD=0)} | | | |

FIG. 18

| Command PIU |||||||||
|---|---|---|---|---|---|---|---|---|
| 0 Transaction Type |||| 1 Flags |||| 2 LUN | 3 Task Tag |
| 4 Initiator ID | Command Set Type ||| 5 Reserved |||| 6 Reserved | 7 Reserved |
| 8 Total EHS Length(02h) |||| 9 Reserved |||| 10 (MSB) Data Segment Length | 11 (LSB) |
| 12 (MSB) |||| 13 | 14 ||| 15 (LSB) |
| Expected Data Transfer Length |||||||||

| Bit Byte | 7 | 6 | 5 | 4 | 3 | 2 | 1 | 0 |
|---|---|---|---|---|---|---|---|---|
| 0 | OPERATION CODE (B5h) ||||||||
| 1 | SECURITY PROTOCOL ||||||||
| 2 | SECURITY PROTOCOL SPECIFIC (Region Info) ||||||||
| 3 | ||||||||
| 4 | Reserved ||||||||
| 5 | Reserved ||||||||
| 6 | ALLOCATION LENGTH (RPMB Data Size) ||||||||
| 9 | ||||||||
| 10 | Reserved ||||||||
| 11 | CONTROL=00h ||||||||

| 28 CDB[12]=00h | 29 CDB[13]=00h | 30 CDB[14]=00h | 31 CDB[15]=00h |
|---|---|---|---|

EHS field:
| 0~3 | EHS Header |
|---|---|
| 4~5 | Request Message Type – 0003h |
| 6~21 | Nonce – Nonce from the host |
| 22~25 | Write Counter – Current Counter Value |
| 26~27 | Address – Address |
| 28~29 | Advanced RPMB Block Count – Number of Advanced RPMB Data Block |
| 30~31 | Result – 0000h |
| 32~63 | MAC from the host |

METADATA: rows 4~29
AUTHENTICATED DATA: rows 32~63

FIG. 21

| Command PIU |||||||||
|---|---|---|---|---|---|---|---|---|
| 0 Transaction Type |||| 1 Flags |||| 2 LUN | 3 Task Tag |
| 4 Initiator ID | Command Set Type ||| 5 Reserved |||| 6 Reserved | 7 Reserved |
| 8 Total EHS Length(02h) |||| 9 Reserved |||| 10 (MSB) Data Segment Length | 11 (LSB) |
| 12 (MSB) |||| 13 |||| 14 | 15 (LSB) |
| Expected Data Transfer Length |||||||||

| Bit / Byte | 7 | 6 | 5 | 4 | 3 | 2 | 1 | 0 |
|---|---|---|---|---|---|---|---|---|
| 0 | OPERATION CODE (A2h) ||||||||
| 1 | SECURITY PROTOCOL ||||||||
| 2 | SECURITY PROTOCOL SPECIFIC (Region Info) ||||||||
| 3 |  ||||||||
| 4 | Reserved ||||||||
| 5 | Reserved ||||||||
| 6 | TRANSFER LENGTH ||||||||
| 9 |  ||||||||
| 10 | Reserved ||||||||
| 11 | CONTROL=00h ||||||||

EHS field:
| Bytes | Content | |
|---|---|---|
| 0~3 | EHS Header | |
| 4~5 | Request Message Type − 0004h | METADATA |
| 6~21 | Nonce − Nonce from the host | |
| 22~25 | Write Counter − 0...00h | |
| 26~27 | Address − Address | |
| 28~29 | Advanced RPMB Block Count − Number of Advanced RPMB Data Block | |
| 30~31 | Result − 0000h | AUTHENTICATED DATA |
| 32~63 | MAC − 0...00h | |

FIG. 24

| Command PIU ||||
|---|---|---|---|
| 0 Transaction Type | 1 Flags | 2 LUN | 3 Task Tag |
| 4 Initiator ID / Command Set Type | 5 Reserved | 6 Reserved | 7 Reserved |
| 8 Total EHS Length(02h) | 9 Reserved | 10 (MSB) Data Segment Length | 11 (LSB) |
| 12 (MSB) | 13 | 14 | 15 (LSB) |
| Expected Data Transfer Length ||||

| Bit / Byte | 7 | 6 | 5 | 4 | 3 | 2 | 1 | 0 |
|---|---|---|---|---|---|---|---|---|
| 0 | OPERATION CODE (A2h) ||||||||
| 1 | SECURITY PROTOCOL ||||||||
| 2 | SECURITY PROTOCOL SPECIFIC (Region Info) ||||||||
| 3 | ||||||||
| 4 | Reserved ||||||||
| 5 | Reserved ||||||||
| 6 | TRANSFER LENGTH ||||||||
| 9 | ||||||||
| 10 | Reserved ||||||||
| 11 | CONTROL=00h ||||||||

EHS field:
| | |
|---|---|
| 0~3 | EHS Header |
| 4~5 | Request Message Type – 0001h |
| 6~21 | Nonce – 0...00h |
| 22~25 | Write Counter – 0...00h |
| 26~27 | Address – 0000h |
| 28~29 | Advanced RPMB Block Count – 0000h |
| 30~31 | Result – 0000h |
| 32~63 | Key |

Bytes 4~31: METADATA
Bytes 32~63: AUTHENTICATED DATA

STORAGE DEVICE INCLUDING REPLAY PROTECTED MEMORY BLOCK (RPMB) HOST DEVICE ACCESSING THE RPMB, ELECTRONIC DEVICE INCLUDING STORAGE DEVICE AND HOST DEVICE, AND METHOD OF OPERATING THE SAME

CROSS-REFERENCE TO RELATED APPLICATION

This patent document claims the priority and benefits of the Korean patent application number 10-2020-0122028, filed on Sep. 22, 2020 and the Korean patent application number 10-2021-0106006, filed on Aug. 11, 2021, the entire contents of the above-listed application are incorporated by reference as part of the disclosure of this document.

TECHNICAL FIELD

The disclosed technology relates to an electronic device, and more particularly, to a storage device, a host device, an electronic device including the storage device and the host device, and a method of operating the same.

BACKGROUND

A storage or data storage device may include a memory device that stores data and a controller that allows a host device such as a computer or a smartphone to read the data from and/or write the data to the data storage device. The memory device may include characterized as a volatile memory device or a nonvolatile memory device depending on its capability to hold stored data in the absence of power.

The volatile memory device retains the stored data while powered on but when the power is interrupted, the stored data is lost. Examples of the volatile memory device may include a static random access memory (SRAM) and a dynamic random access memory (DRAM).

The nonvolatile memory device can retain the stored data even in the absence of a power source. Examples of the nonvolatile memory device include a read only memory (ROM), a programmable ROM (PROM), an electrically programmable ROM (EPROM), an electrically erasable and programmable ROM (EEPROM), and a flash memory.

SUMMARY

The embodiments of the disclosed technology, among other features and benefits, provide a host device providing an improved security function, an electronic device including the host device, and a method of operating the same.

In an embodiment of the disclosed technology, a storage device may include a nonvolatile memory device that includes a replay protected memory block (RPMB), and a memory controller configured to receive a command protocol information unit (PIU) including a host RPMB message from an external host and store data in the RPMB according to authentication performed using the host RPMB message. The command PIU may include a basic header segment included in common in a PIU transmitted/received between the external host and the memory controller, and an extra header segment including the host RPMB message.

In some embodiments of the disclosed technology, a storage device may include a nonvolatile memory device comprising a replay protected memory block (RPMB), and a memory controller configured to receive a command protocol information unit (PIU) including a host RPMB message from an external host and read data stored in the RPMB. The command PIU may include a basic header segment included in common in a PIU transmitted/received between the external host and the memory controller, and an extra header segment including the host RPMB message.

In some embodiments of the disclosed technology, a host device controlling a storage device including a replay protected memory block (RPMB) may include a host message authentication code (MAC) calculator configured to calculate a host MAC using host metadata, and a host PIU generator configured to provide a command protocol information unit (PIU) instructing the storage device to access the RPMB. The command PIU may include a basic header segment included in common in a PIU transferred between the host device and the storage device, and an extra header segment including the host MAC and the host metadata.

In some embodiments of the disclosed technology, an electronic device may include a storage device including a replay protected memory block (RPMB), and a host device configured to provide a command protocol information unit (PIU) instructing the storage device to access the RPMB. The command PIU may include a basic header segment including a total extra header segment length field having a value other than 0 and an extra header segment including a host RPMB message.

In some embodiments of the disclosed technology, a storage device may include a nonvolatile memory device comprising a replay protected memory block (RPMB) that is accessible upon successful completion of an authentication, and a memory controller coupled to the nonvolatile memory device to control operations thereof and configured to receive a command protocol information unit (PIU) that includes a basic header segment and an extra header segment, wherein the basic header segment is included in common in PIUs transmitted or received between the host and the memory controller, and the extra header segment includes a host RPMB message from a host and store data in the RPMB based on the authentication performed using the host RPMB message.

In some embodiments of the disclosed technology, a storage device may include a nonvolatile memory device comprising a replay protected memory block (RPMB) that is accessible based on an authentication, and a memory controller coupled to the nonvolatile memory device to control operations thereof and configured to receive a command protocol information unit (PIU) that includes a basic header segment and an extra header segment, wherein the basic header segment is included in common in PIUs transmitted or received between the host and the memory controller, and the extra header segment includes a host RPMB message from a host and read data stored in the RPMB.

In some embodiments of the disclosed technology, a host device is configured to control operations of a storage device that includes a replay protected memory block (RPMB) that is accessible based on an authentication. The host device may include a host message authentication code (MAC) calculator configured to calculate a host MAC using host metadata, and a host PIU generator configured to provide a command protocol information unit (PIU) instructing the storage device to access the RPMB. The command PIU includes a basic header segment that is included in common in PIUs transferred between the host device and the storage device, and an extra header segment including the host MAC and the host metadata.

In some embodiments of the disclosed technology, an electronic device may include a storage device comprising a replay protected memory block (RPMB) that is accessible based on an authentication, and a host device configured to provide a command protocol information unit (PIU) instructing the storage device to access the RPMB. The command PIU comprises a basic header segment and an extra header segment, and wherein the basic header segment includes a total extra header segment length field having a value other than 0, and the extra header segment includes a host RPMB message.

The disclosed technology can be implemented in some embodiments to provide a storage device with an improved security function, a host device, an electronic device including the storage device and the host device, and a method of operating the storage device, the host device and the user system.

BRIEF DESCRIPTION OF THE DRAWINGS

FIG. 6 is a diagram illustrating an example of an RPMB message.

FIG. 9 is a diagram illustrating an example of an RPMB message provided through operation S805 of FIG. 8.

FIG. 10 is a diagram illustrating an example of an RPMB message provided through operation S813 of FIG. 8.

FIG. 11 is a diagram illustrating an example of an RPMB message provided through operation S819 of FIG. 8.

FIG. 13 is a diagram illustrating an example of an RPMB message provided through operation S1005 of FIG. 12.

FIG. 14 is a diagram illustrating an example of an RPMB message provided through operation S1011 of FIG. 12.

FIG. 15 is a diagram illustrating an example configuration of a command PIU.

FIG. 16 is a diagram illustrating an example configuration of a response PIU.

FIG. 18 is a diagram illustrating an example structure of a command PIU transferred in operation S1201 of FIG. 17.

FIG. 21 is a diagram illustrating an example structure of a command PIU transferred in operation S1301 of FIG. 20.

FIG. 24 is a diagram illustrating an example of a command PIU provided in the authentication key programming operation.

DETAILED DESCRIPTION

The technology disclosed in this patent document can be implemented in various embodiments to provide data storage devices and data storage methods that, among other features and benefits, can provide improved security by using security protocols that include replay protected memory block features. Specific structural or functional descriptions of embodiments disclosed in the present specification or application are illustrated only to describe example embodiments of the disclosed technology. The embodiments of the disclosed technology may include implemented in various forms and should not be construed as being limited to the embodiments described in the present specification or application.

Figure 1:
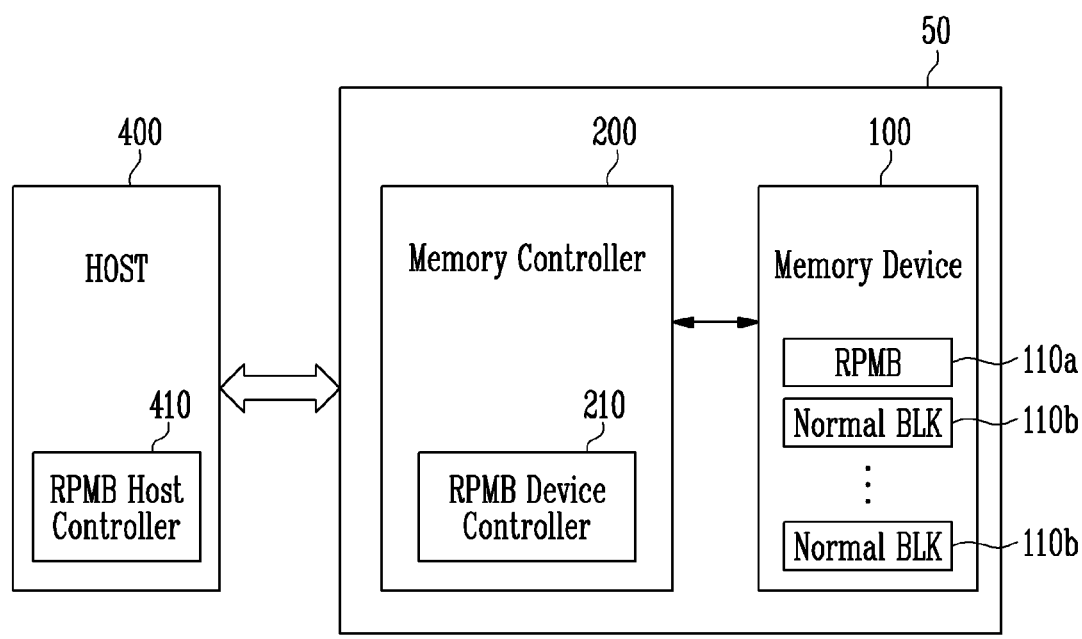
FIG. 1 is a diagram illustrating an example of a storage device based on some embodiments of the disclosed technology.

FIG. 1 is a diagram illustrating an example of a storage device based on some embodiments of the disclosed technology.

Referring to FIG. 1, the storage device 50 may include a memory device 100 and a memory controller 200. The storage device 50 may include a device that stores data under control of a host 400 such as a cellular phone, a smartphone, an MP3 player, a laptop computer, a desktop computer, a game player, a TV, a tablet PC, or an in-vehicle infotainment system. Alternatively, the storage device 50 may include a device that stores data under the control of the host 400 that stores high-capacity data in one place, such as a server or a data center.

The storage device 50 may be any type of data storage device that is in communication with the host 400 via a host interface. Examples of the storage device 50 may include an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The storage device 50 may be manufactured as any one of various types of packages. For example, the storage device 50 may be manufactured as any one of various types of package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 operates under control of the memory controller 200. The memory device 100 may include a memory cell array (not shown) including a plurality of memory cells that store data.

Each of the memory cells may be configured as a single level cell (SLC) that stores one data bit, a multi-level cell (MLC) that stores two data bits, a triple level cell (TLC) that stores three data bits, or a quad level cell (QLC) capable of storing four data bits The memory cell array (not shown) may include a plurality of memory blocks. Each memory block may include a plurality of pages. In an embodiment, the page may be the minimum unit for read or write (program) operations on the memory device 100. The memory block may be the minimum unit for erase operations.

The memory blocks included in the memory device 100 may include a protected memory block such as a replay protected memory block (RPMB) 110a and a normal block Normal BLK or 110b. The protected memory block is configured to store information for authenticating data to be read from or written to the memory device and can be accessed only upon successful authentication based on a security authentication protocol to defeat unauthenticated accesses including replay attacks.

The RPMB 110a may include a memory block that is accessible only through a predetermined special command or authentication. The normal block 110b may include a memory block that may be accessed without separate authentication. The normal block 110b may include a memory block that stores data other than data stored in the RPMB 110a.

When the storage device 50 supports the technical features associated with the RPMB 110a, the RPMB 110a may be accessed according to two or more modes. For example, the RPMB 110a may be accessed in any one of a normal RPMB mode or an advanced RPMB mode.

A write count value indicating the number of times data is successfully stored in the RPMB 110a may be limited to a predetermined number of times. Therefore, when the write count value for the RPMB 110a reaches a maximum write count value, only a read operation on the RPMB 110a may be allowed.

A unit for a write or program operation for storing data in the RPMB 110a and a unit for a read operation for reading data from the RPMB 110a may be determined in advance. For example, when the RPMB 110a is accessed in the normal RPMB mode, data may be stored or read in a unit of 256 Bytes. When the RPMB 110a is accessed in the advanced RPMB mode, data may be stored or read in a unit of 4 Kbytes. However, the unit or size of data accessed in the advanced RPMB mode is not limited to 4 Kbyte, and may vary depending on the unit of data on the basis of which the program operation performed by the memory device 100.

Access to the RPMB 110a may be allowed only when authentication is successful. The authentication for the RPMB 110a may include storing, by each of the host 400 and the storage device 50, the same authentication key only once for the first time, and determining whether message authentication codes (MACs) generated by each of the host 400 and the storage device 50 match using previously agreed data and authentication key. The MAC may be generated by each of the host 400 and the storage device 50 using a hash-based MAC (HMAC SHA-256), but the disclosed technology is not limited thereto. The data stored in the RPMB 110a may be maintained while the authentication key and the write count value of the RPMB 110a are maintained.

In FIG. 1, the memory device 100 includes one RPMB 110a, but the memory device 100 may include two or more RPMBs 110a. In this case, each RPMB 110a may have unique authentication key and write count value.

In an embodiment, one RPMB 110a may be partitioned into a plurality of RPMB regions. The maximum number of RPMB regions included in the RPMB 110a may be four. Each RPMB region may have unique authentication key and write count value.

The RPMB regions included in the RPMB 110a may be defined according to an RPMB descriptor. The RPMB descriptor may be provided by a command provided by the host 400 to the storage device 50 or a command provided by the storage device 50 to the host 400. The RPMB descriptor may include 8 bits of RPMB region enable value bRPMBRegionEnable for setting the RPMB regions included in the RPMB 110a.

In an embodiment, the mode that supports the access by the storage device 50 to the RPMB 110a of the normal RPMB mode and the advanced RPMB mode may be determined using the RPMB region enable value bRPMBRegionEnable.

In an embodiment, the RPMB region enable value bRPMBRegionEnable may be set according to a rule described in Table 1 below.

TABLE 1

| Bit | Rule |
| --- | --- |
| BIT-0 | Don't care. RPMB region 0 is always enabled independent of this bit value |
| BIT-1 | Set to 1 to enable RPMB region 1 |
| BIT-2 | Set to 1 to enable RPMB region 2 |
| BIT-3 | Set to 1 to enable RPMB region 3 |
| BIT-4 | Set to 1 to enable Advanced RPMB Mode. (Set to 0 to enable Normal RPMB Mode. |
| BIT-5, BIT-6, BIT-7 | Reserved |

In an embodiment, an access method of the RPMB 110a may be set to the normal RPMB mode or the advanced RPMB mode according to the RPMB region enable value bRPMBRegionEnable. The storage device 50 may determine that a request of the host 400 is failed when an access request for the RPMB 110a provided by the host 400 is different from a set RPMB mode.

In an embodiment, the memory device 100 may include at least one of a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM), a spin transfer torque random access memory (STT-RAM), or others. In this patent document, for convenience of description, it is assumed that the memory device 100 is a NAND flash memory.

The memory device 100 is configured to receive a command and an address from the memory controller 200 and access an area selected by the address in the memory cell array. The memory device 100 may perform an operation instructed by the command on the area selected by the address. For example, the memory device 100 may perform a write operation (program operation), a read operation, and an erase operation. During the program operation, the memory device 100 may program data in the area selected by the address. During the read operation, the memory device 100 may read data from the area selected by the address. During the erase operation, the memory device 100 may erase data stored in the area selected by the address.

The memory controller 200 may control an overall operation of the storage device 50.

When power is applied to the storage device 50, the memory controller 200 may execute operations associated with firmware such as a flash translation layer (FTL) for controlling the communication between the host 400 and the memory device 100.

In an embodiment, the memory controller 200 may receive data and a logical block address (LBA) from the host 400 and may convert the LBA into a physical block address (PBA) that indicates a physical location or address of memory cells in which data included in the memory device 100 is to be stored.

The memory controller 200 may control the memory device 100 to perform the program operation, the read operation, or the erase operation according to a request of the host 400. During the program operation, the memory controller 200 may provide a program command, the PBA, and data to the memory device 100. During the read operation, the memory controller 200 may provide a read command and the PBA to the memory device 100. During the erase operation, the memory controller 200 may provide an erase command and the PBA to the memory device 100.

In an embodiment, the memory controller 200 may generate a command, an address, and data on independently regardless of the request from the host 400 and transmit the command, the address, and the data to the memory device 100. For example, the memory controller 200 may provide the command, the address, and the data for performing a program operation, a read operation, and an erase operation accompanying in performing wear leveling, read reclaim, garbage collection, and others, to the memory device 100.

In an embodiment, the memory controller 200 may control operations of two or more memory devices 100. In this case, the memory controller 200 may control the memory devices 100 using an interleaving method to improve the operation performance. The interleaving method may include controlling operations for at least two memory devices 100 to overlap with each other.

The host 400 may communicate with the storage device 50 using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

In the present specification, for convenience of description, the storage device 50 and the host 400 perform data communication using an UFS communication interface, but the disclosed technology is not limited to the UFS communication interface with respect to the data communication interface. Specifically, the storage device 50 and the host 400 may perform the data communication using a command defined as a protocol information unit (PIU). The PIU may include a data packet generated according to a predetermined protocol.

The PIU may include a command that the host 400 or the storage device 50 requests to perform, instruct, or respond to any operation. In an embodiment, various PIUs may be defined according to a use and a purpose. For example, the PIU may include any one of a query request PIU, a command PIU, a response PIU, a data-out PIU, a data-in PIU, and a ready-to-transfer PIU.

In an embodiment, the query request PIU may include a device descriptor that provides various parameters of the storage device 50. The device descriptor may include information indicating whether the storage device 50 is the storage device supporting the advanced RPMB mode.

A size of the smallest unit of the PIU may be 32 bytes, and a maximum size of the PIU may be 65600 bytes. A format of the PIU may have different sizes according to a type thereof.

The memory controller 200 may include an RPMB device controller 210.

The RPMB device controller 210 may process an access request of the host 400 to the RPMB 110*a*.

The RPMB device controller 210 may process an authenticated data write operation of storing data in the RPMB 110*a* and an authenticated data read operation of reading data stored in the RPMB 110*a*. A specific method for the RPMB device controller 210 to process the authenticated data write operation and the authenticated data read operation is described in more detail with reference to FIGS. 7 to 22 to be described later.

The host 400 may further include an RPMB host controller 410.

The RPMB host controller 410 may generate PIUs for controlling the RPMB 110*a* and provide the PIUs to the RPMB device controller 210. The RPMB host controller 410 may receive the PIU from the RPMB device controller 210.

The RPMB device controller 210 and the RPMB host controller 410 are described in more detail with reference to FIGS. 7, 26 and 27 to be described later.

Figure 2:
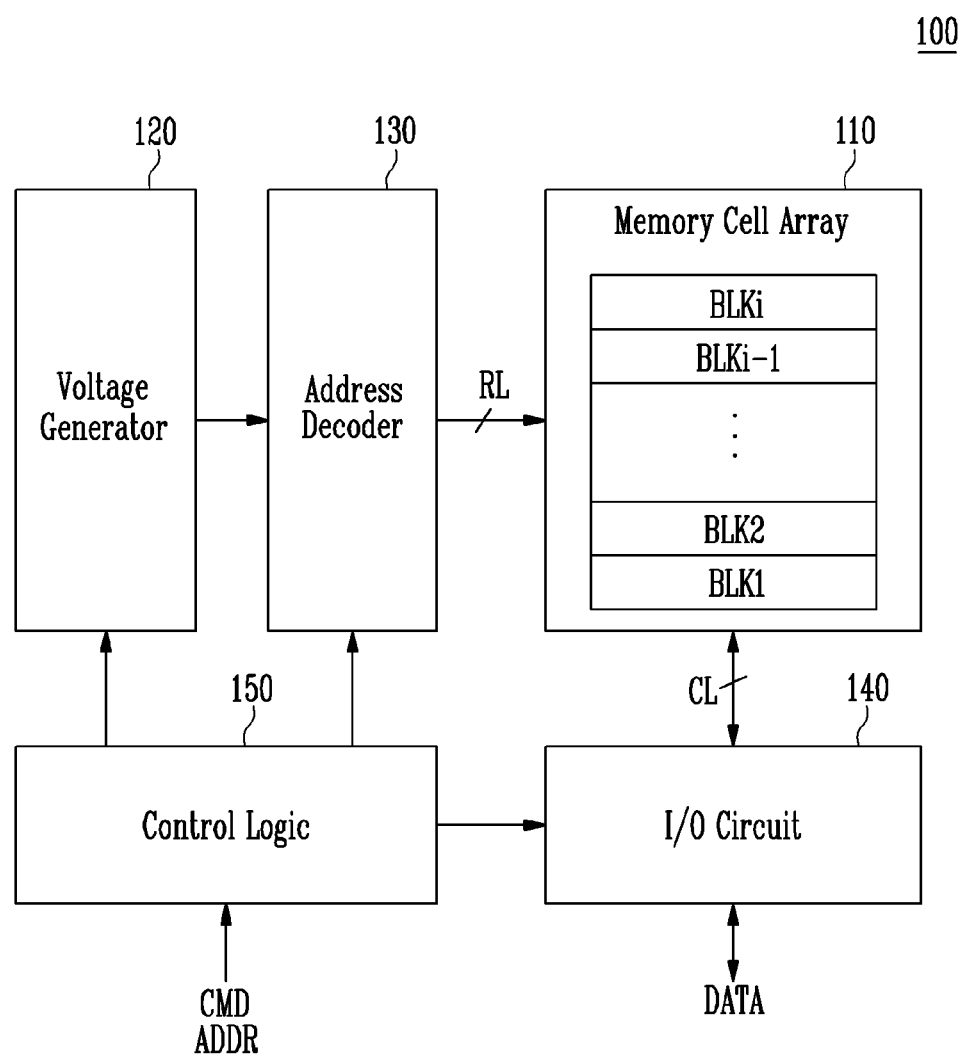
FIG. 2 is a diagram illustrating an example of a memory device of FIG. 1.

FIG. 2 is a diagram illustrating an example of the memory device of FIG. 1.

Referring to FIG. 2, the memory device 100 may include a memory cell array 110, a voltage generator 120, an address decoder 130, an input/output circuit 140, and a control logic 150.

The memory cell array 110 includes a plurality of memory blocks BLK1 to BLKi. The plurality of memory blocks BLK1 to BLKi are connected to the address decoder 130 through row lines RL. The plurality of memory blocks BLK1 to BLKi may be connected to the input/output circuit 140 through column lines CL. In an embodiment, the row lines RL may include word lines, source select lines, and drain select lines. In an embodiment, the column lines CL may include bit lines.

Each of the plurality of memory blocks BLK1 to BLKi includes a plurality of memory cells. In an embodiment, the plurality of memory cells may include nonvolatile memory cells. Memory cells connected to the same word line among the plurality of memory cells may be defined as one physical page. That is, the memory cell array 110 may include a plurality of physical pages. Each of the memory cells of the memory device 100 may be configured as a single level cell (SLC) that stores one data bit, a multi-level cell (MLC) that stores two data bits, a triple level cell (TLC) that stores three data bits, or a quad level cell (QLC) capable of storing four data bits.

Some of the plurality of memory blocks BLK1 to BLKi may include the RPMB 110a described with reference to FIG. 1, and the others of the plurality of memory blocks BLK1 to BLKi may include the normal block 110b.

In an embodiment, the voltage generator 120, the address decoder 130, and the input/output circuit 140 may be collectively referred to as a peripheral circuit. The peripheral circuit may be used to operate the memory cell array 110 under control of the control logic 150. The peripheral circuit may be used to operate the memory cell array 110 to perform the program operation, the read operation, and the erase operation.

The voltage generator 120 is configured to generate a plurality of operating voltages using an external power voltage supplied to the memory device 100. The voltage generator 120 operates in response to the control of the control logic 150.

In some implementations of the disclosed technology, the voltage generator 120 may generate an internal power voltage by regulating the external power voltage. The internal power voltage generated by the voltage generator 120 is used as an operating voltage of the memory device 100.

In some implementations of the disclosed technology, the voltage generator 120 may generate the plurality of operating voltages using an external power voltage or an internal power voltage. The voltage generator 120 may be configured to generate various voltages required in the memory device 100. For example, the voltage generator 120 may generate a plurality of erase voltages, a plurality of program voltages, a plurality of pass voltages, a plurality of selected read voltages, and a plurality of unselected read voltages.

The voltage generator 120 may include a plurality of pumping capacitors that receive the internal power voltage to generate the plurality of operating voltages having various voltage levels, and may generate the plurality of operating voltages by selectively activating the plurality of pumping capacitors in response to the control of the control logic 150.

The generated plurality of operating voltages may be supplied to the memory cell array 110 by the address decoder 130.

The address decoder 130 is connected to the memory cell array 110 through the row lines RL. The address decoder 130 is configured to operate in response to the control of the control logic 150. The address decoder 130 may receive an address ADDR from the control logic 150. The address decoder 130 may decode a block address among the received addresses ADDR. The address decoder 130 selects at least one memory block among the memory blocks BLK1 to BLKi according to the decoded block address. The address decoder 130 may decode a row address among the received addresses ADDR. The address decoder 130 may select at least one word line among word lines of a selected memory block according to the decoded row address. In an embodiment, the address decoder 130 may decode a column address among the received addresses ADDR. The address decoder 130 may connect the input/output circuit 140 and the memory cell array 110 to each other according to the decoded column address.

For example, the address decoder 130 may include components such as a row decoder, a column decoder, and an address buffer.

The input/output circuit 140 may include a plurality of page buffers. The plurality of page buffers may be connected to the memory cell array 110 through the bit lines. During the program operation, data may be stored in selected memory cells according to data stored in the plurality of page buffers.

During the read operation, the data stored in the selected memory cells may be sensed through the bit lines, and the sensed data may be stored in the page buffers.

The control logic 150 may control the operations of the address decoder 130, the voltage generator 120, and the input/output circuit 140. The control logic 150 may operate in response to the command CMD transmitted from an external device. The control logic 150 may generate control signals in response to the command CMD and the address ADDR to control the peripheral circuits.

Figure 3:
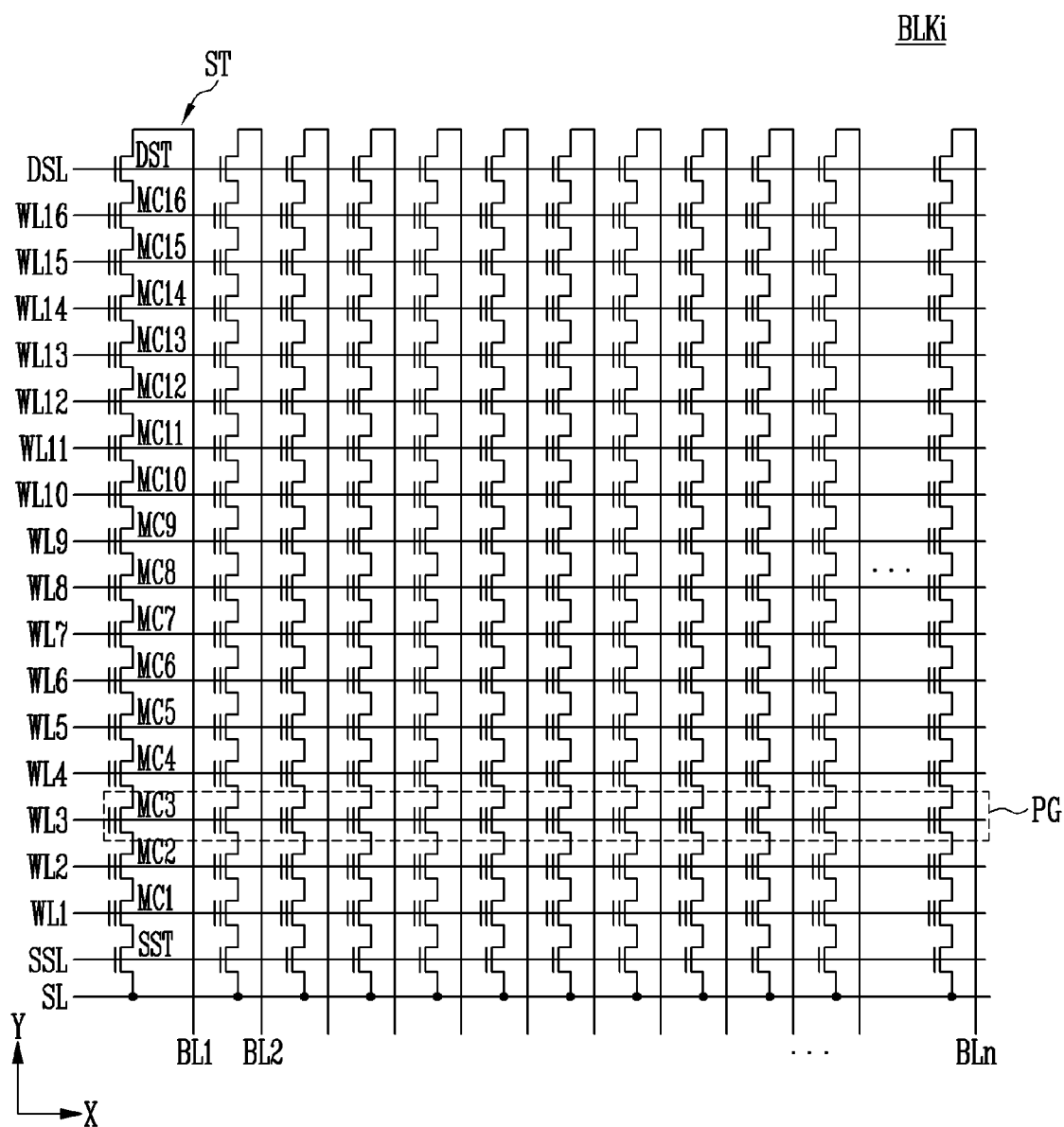
FIG. 3 is a diagram illustrating an example configuration of any one of memory blocks of FIG. 2.

FIG. 3 is a diagram illustrating an example configuration of any one of the memory blocks of FIG. 2.

The memory block BLKi is any one BLKi of the memory blocks BLK1 to BLKi of FIG. 2.

Referring to FIG. 3, a plurality of word lines arranged in parallel with each other may be connected between a first select line and a second select line. Here, the first select line may include the source select line SSL, and the second select line may include the drain select line DSL. More specifically, the memory block BLKi may include a plurality of strings ST (e.g., a string of memory cells) connected between the bit lines BL1 to BLn and the source line SL. The bit lines BL1 to BLn may be connected to the strings ST, respectively, and the source line SL may be connected in common to the strings ST. Since the strings ST may be configured to be identical to each other, a string ST connected to the first bit line BL1 is specifically described, as an example.

The string ST may include a source select transistor SST, a plurality of memory cells MC1 to MC16, and a drain select transistor DST connected in series between the source line SL and the first bit line BL1. A string ST may include at least one of the source select transistor SST and the drain select transistor DST, and may include the memory cells MC1 to MC16. In other implementations, a string may include more than 16 memory cells shown in FIG. 3.

A source of the source select transistor SST may be connected to the source line SL and a drain of the drain select transistor DST may be connected to the first bit line BL1. The memory cells MC1 to MC16 may be connected in series between the source select transistor SST and the drain select transistor DST. Gates of the source select transistors SST included in the different strings ST may be connected to the source select line SSL, gates of the drain select transistors DST may be connected to the drain select line DSL, and gates of the memory cells MC1 to MC16 may be connected to the plurality of word lines WL1 to WL16. A group of the memory cells connected to the same word line among the memory cells included in different strings ST may be referred to as a page PG. Therefore, the memory block BLKi may include the same number of pages PG as the number of the word lines WL1 to WL16.

In some implementations, each memory cell may be a single level cell (SLC) that stores one bit of data. In this case, one physical page PG may be mapped to one logical page (LPG) to store one bit data per cell. Each logical page (LPG) may include data bits of the same number as memory cells included in one physical page PG.

In other implementations, each memory cell may be a multi-level cell (MLC) that stores two bits of data or a memory cell that stores three or more bits of data per cell. In this case, each physical page PG may be mapped to more than one logical page (LPG).

Figures 4, 5:
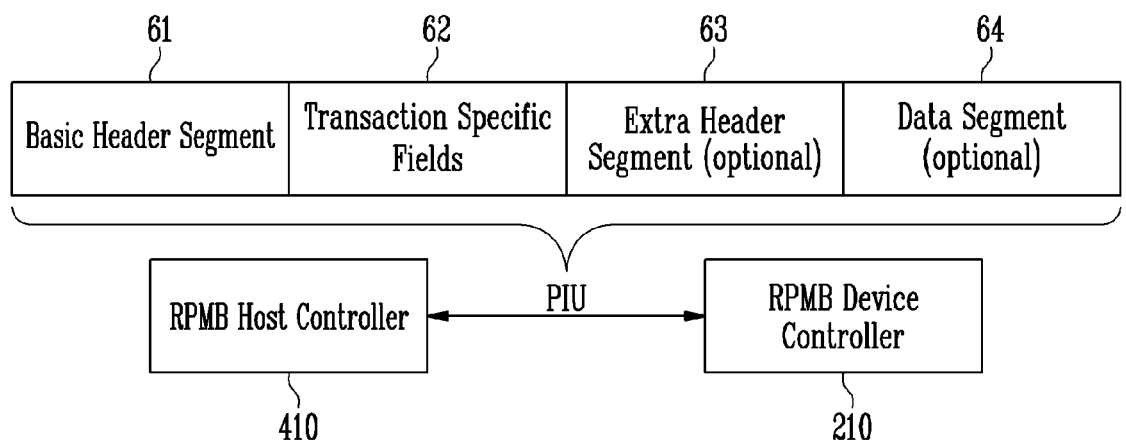
FIG. 4 is a diagram illustrating a unit of data communication between an RPMB host controller 410 and an RPMB device controller 210.
FIG. 5 is a diagram illustrating an example structure of a basic header segment of a protocol information unit (PIU).

FIG. 4 is a diagram illustrating a unit of data communication between the RPMB host controller 410 and the RPMB device controller 210.

Referring to FIGS. 1 and 4, the RPMB host controller 410 and the RPMB device controller 210 may communicate using data packets referred to as a protocol information unit (PIU). In terms of a physical device, the RPMB host controller 410 is included in the host 400, and the RPMB device controller 210 is included in the storage device 50. In terms of interfacing between two devices, one device may transmit the PIU to the other device. In this case, a device that generates the PIU may be referred to as an initiator device, and a device that receives the generated PIU may be referred to as a target device. That is, the PIU may include a data packet transmitted between two devices rather than a data packet unilaterally transmitted by one of the host 400 or the storage device 50 to the other device.

The PIU may include a query request PIU, a command PIU, a response PIU, a data out PIU, a data in PIU, and a ready-to-transfer PIU according to an operation to be performed by the RPMB host controller 410 or the RPMB device controller 210.

The query request PIU may include a device descriptor that provides various parameters of the storage device 50. The device descriptor may include information indicating whether the storage device 50 is the storage device supporting the advanced RPMB mode. In an embodiment, the query request PIU may include an RPMB descriptor.

The RPMB host controller 410 may provide the query request PIU including the RPMB descriptor to the RPMB device controller 210. The RPMB descriptor may include 8 bits of RPMB region enable value bRPMBRegionEnable for setting the RPMB regions included in the RPMB 110a. In an embodiment, the mode that the storage device 50 supports the access to the RPMB 110a of the normal RPMB mode and the advanced RPMB mode may be determined using the RPMB region enable value bRPMBRegionEnable.

The command PIU may include a PIU transmitted when the host 400 transfers a command to the storage device 50.

The response PIU may include a PIU transferred when the storage device 50 provides a response to the command provided by the host 400.

The data out PIU may include a PIU transmitted when the host 400 provides data to the storage device 50.

The data in PIU may include a PIU transmitted when the storage device 50 provides data to the host 400.

The ready to transfer PIU may include a PIU transmitted when the storage device 50 informs that the storage device 50 is ready to receive the data out PIU from the host 400. The ready to transfer PIU may be transmitted when the storage device 50 has a sufficient buffer space to store data provided by the host 400.

A size of the smallest PIU may be 32 bytes, and a maximum size of the PIU may be 65600 bytes. A format of the PIU may have different sizes according to a type thereof.

The PIU may include a basic header segment 61, a transaction specific field 62, an extra header segment 63, and a data segment 64.

The basic header segment 61 may have a size of 12 bytes. The basic header segment 61 may be included in common in all PIUs. The basic header segment 61 may include basic setting information on the PIU.

The transaction specific field 62 may be included in a byte address "31" from a byte address "12" of the PIU. The transaction specific field 62 may include a dedicated transaction code according to the type of the PIU.

The extra header segment 63 may be defined when a total extra header segment length (Total EHS Length) field of the basic header segment 61 has a value other than 0. The extra header segment 63 may start from a byte address "32" of the PIU. The extra header segment 63 may be an area capable of additionally storing data when sufficient information may not be included in the basic header segment 61.

The data segment 64 may be included in the data out PIU or the data in PIU, and may not be included in other PIUs.

In an embodiment, the extra header segment 63 and the data segment 64 may not be included in all protocol PIUs, but may be included only in a specific PIU.

FIG. 5 is a diagram illustrating an example structure of a basic header segment of the PIU.

Referring to FIG. 5, the basic header segment 61 may include a transaction type, flags, a logical unit number (LUN), a task tag, an initiator ID, a command set type, a query function/task management function (Query Function, Task Manag. Function), a response, a status, a total extra header segment length (Total EHS Length), device information, and a data segment length.

The transaction type may have a unique value according to the type of the PIU. An example of the transaction type according to the type of the PIU is shown in [Table 2] below.

TABLE 1

| When initiator device provides target device | Transaction type | When target device provides initiator device | Transaction type |
|---|---|---|---|
| Command PIU | 00 0001b | Response PIU | 10 0001b |
| Data out PIU | 00 0010b | Data in PIU | 10 0010b |
| X | X | Ready to transfer PIU | 11 0001b |

The flags may include fields having different values according to the transaction type.

The LUN may include a field indicating a number of a logical unit on which an operation is to be performed among a plurality of logical units included in an object on which an operation is to be performed. For example, each of the host 400 and the storage device 50 described with reference to FIG. 1 may include a plurality of logical units, and the LUN of the basic header segment 61 included in the PIU may indicate a specific logical unit among the plurality of logical units.

The task tag may include fields having different values according to the transaction type.

The initiator ID may include a field identifying who is an initiator requesting an operation. Therefore, the initiator ID may have different values in a case where the host generates the PIU and the storage device generates the PIU.

The command set type may include a field included in the command PIU and the response PIU. The command set type may include a field indicating which interface a command supports, such as whether the command is an SCSI command, a UFS command, or a command defined by a manufacturer.

The query function/task management function (Query Function, Task Manag. Function) may include a field input to the PIU such as a query request, a query response, or a task management request.

The response may include a field indicating whether performance of the requested operation is successful or failed.

The status may include a field indicating an SCSI status.

The total extra header segment length (Total EHS Length) may include a field indicating a size of the extra header segment in 32 bit unit. The total extra header segment length (Total EHS Length) may be used when the PIU includes an extra header segment. The length of the extra header segment may include 4 byte unit. A maximum size of the extra header segment may include 1024 bytes. When the extra header segment is not used, the total extra header segment length (Total EHS Length) may include 0.

The device information may include information used only when performing a specific function.

The data segment length may include a field indicating a length of a data segment of the PIU. When the PIU does not include the data segment, the data segment length may include 0.

FIG. 6 is a diagram illustrating an example of an RPMB message.

Referring to FIGS. 1 and 6, when the host 400 or the storage device 50 transmits/receives the PIU related to the RPMB 110a, the host 400 or the storage device 50 may transfer the RPMB message to each other. The RPMB message may include information for authentication.

The RPMB message may include a plurality of components. The RPMB message may include some or all of the plurality of components shown in FIG. 6 according to a situation in which the RPMB message is transferred.

A request message type may have a size of 2 bytes. The request message type may include a component indicating a type of a request to the RPMB 110a. The request message type may be included in a request transmitted by the initiator device to the target device. An example of a code value that the request message type may have is shown in [Table 3] below.

TABLE 3

| Code | Request Message Types |
|---|---|
| 0001h | Authentication Key programming request |
| 0002h | Write Counter read request |
| 0003h | Authenticated data write request |
| 0004h | Authenticated data read request |
| 0005h | Result read request |
| 0006h | Secure Write Protect Configuration Block write request |
| 0007h | Secure Write Protect Configuration Block read request |
| Others | Reserved |

The authentication key programming request may include a request message type requesting to program the authentication key. The write counter read request may include a request message type requesting the write count value stored in a write counter. The authenticated data write request may include a request message type requesting to store data in the RPMB 110a. The authenticated data read request may include a request message type requesting to read the data stored in the RPMB 110a. The result read request may be a request message type requesting a performance result of an operation related to the RPMB 110a (a value stored in a result register).

A response message type may have a size of 2 bytes. The response message type may include a component indicating a type of a response. The response message type may be included in a response transmitted by the target device to the initiator device, rather than being included in the request transmitted by the initiator device to the target device. A code value that the response message type may have is shown in [Table 4] below.

TABLE 4

| Code | Response Message Types |
|---|---|
| 0100h | Authentication Key programming response |
| 0200h | Write Counter read response |
| 0300h | Authenticated data write response |
| 0400h | Authenticated data read response |
| 0500h | Revered |
| 0600h | Secure Write Protect Configuration Block write response |
| 0700h | Secure Write Protect Configuration Block read response |
| Others | Reserved |

The authentication key programming response may be a response message type indicating a response to the RPMB message requesting to program the authentication key. The write counter read response may be a response message type indicating the RPMB message that transmits the write count value stored in the write counter to the initiator device. The authenticated data write response may be a response message type indicating a response to the authenticated data write request requesting to store data in the RPMB 110a. The authenticated data read response may be a response message type indicating a response to the authenticated data read request requesting to read the data stored in the RPMB 110a. A result read response may be a response message type indicating a response to the result read request requesting the performance result of the operation related to the RPMB 110a (the value stored in the result register).

The authentication key may have a size of 32 bytes. The authentication key may include an RPMB message component included in the PIU corresponding to the authentication key programming request when initially requesting programming to the RPMB 110a. Therefore, the authentication key may be included only in the request transmitted by the initiator device to the target device.

The message authentication code (MAC) may have a size of 32 bytes. The MAC may be included in the response transmitted by the target device to the initiator device as well as the request transmitted by the initiator device to the target device. The MAC may include an RPMB message component used for authentication.

A result may have a size of 2 bytes. The result may include a value stored in the result register included in the RPMB 110a. Therefore, the result may be included in a response transmitted by the target device to the initiator device.

The write counter may have a size of 4 bytes. The write counter may indicate the total number of successfully performed authenticated data write operations. The write counter may include the write count value stored in the write counter included in the RPMB 110a. The write counter may be included in the response transmitted by the target device to the initiator device as well as the request transmitted by the initiator device to the target device.

An address may have a size of 2 bytes. The address may include the location that data will be stored in the RPMB 110a or a logical address of data stored in the RPMB 110a. The address may be included in the response transmitted by the target device to the initiator device as well as the request transmitted by the initiator device to the target device.

A nonce may have a size of 16 bytes. The nonce may be an arbitrary number or a random value. The nonce may be included in the response transmitted by the target device to the initiator device as well as the request transmitted by the initiator device to the target device. In an embodiment, the nonce may be generated by the host 400, and the storage device 50 may copy and use the nonce generated by the host 400.

In some implementations, data may include data to be stored in the RPMB 110a or data read from the RPMB 110a. The data may have a size of 256 bytes. In an embodiment, the data may include data transferred between the initiator device and the target device when the RPMB 110a is accessed in the normal RPMB mode.

Advanced RPMB data may include data to be stored in the RPMB 110a or data read from the RPMB 110a in the advanced RPMB mode. The advanced RPMB data may be transmitted in a size of 4 KB unit. The advanced RPMB data may include data to be stored in the RPMB 110a according to the authenticated data write request, or data read from the RPMB 110a by the storage device 50 according to the authenticated data read request.

A block count may have a size of 2 bytes. The block count may include a value indicating the number of blocks of data transferred between the initiator device and the target device in the normal RPMB mode. In the normal RPMB mode, one block may have a size of 256 bytes.

An advanced RPMB block count may include a value indicating the number of blocks of the advanced RPMB data transferred between the initiator device and the target device in the advanced RPMB mode. In the advanced RPMB mode, one block may have a size of 4 KB.

The RPMB message components described with reference to FIG. 6 may be included in the RPMB message transferred between the host 400 and the storage device 50 or between the initiator device and the target device when the RPMB block is accessed in the normal RPMB mode or the advanced RPMB mode. The RPMB message components may be included in one PIU or may be divided and included in a plurality of PIUs according to a type of an operation.

Figure 7:
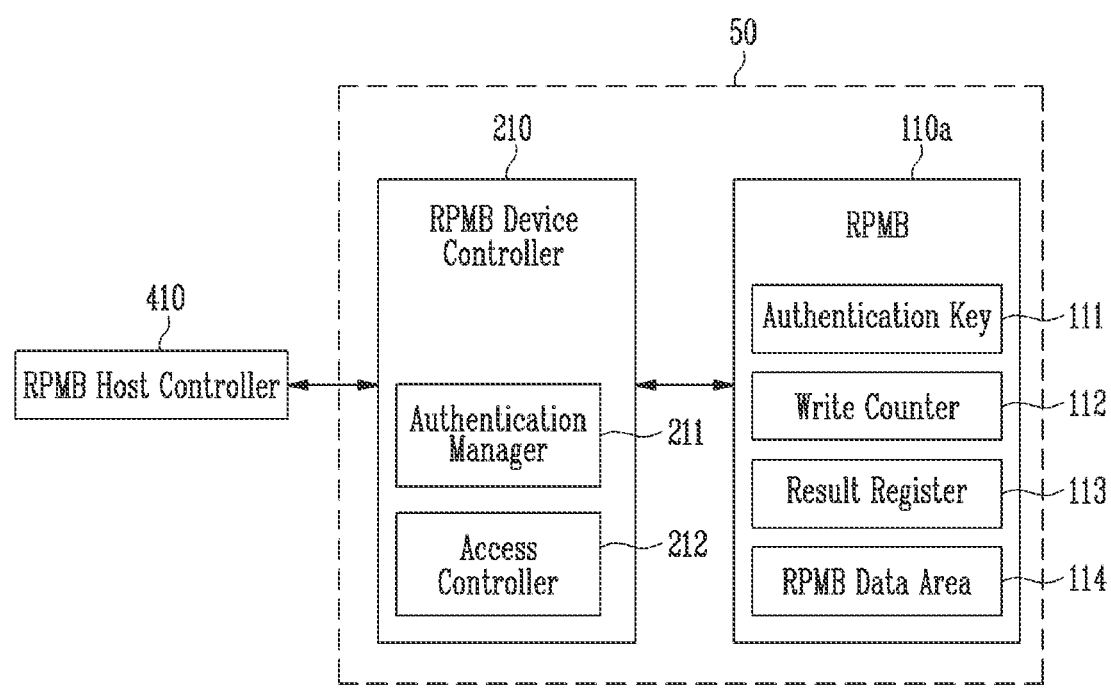
FIG. 7 is a diagram illustrating an example of a storage device based on some embodiments of the disclosed technology.

FIG. 7 is a diagram illustrating an example of a storage device based on some embodiments of the disclosed technology.

Referring to FIGS. 1 and 7, the storage device 50 may include the RPMB 110a and the RPMB device controller 210. The RPMB 110a may include at least one block among the memory blocks included in the memory device 100 described with reference to FIG. 1, and the RPMB device controller 210 may be included in the memory controller 200. The RPMB host controller 410 may be included in the host 400.

The RPMB 110a may include an authentication key 111, a write counter 112, a result register 113, and an RPMB data area 114.

The authentication key 111 may be stored only once for the first time, may not be read except for being used as a key for access to the RPMB 110a when calculating the MAC used to authenticate access to the RPMB 110a. In an embodiment, the authentication key 111 may have a size of 32 bytes, but the size of the authentication key is not limited to 32 bytes.

The write counter 112 may count the number of successful authenticated data write operations performed to store data in the RPMB 110a. The value indicated by the write counter 112 or the value stored in the write counter 112 may include the write count value. The write counter 112 may store a write count value corresponding to 4 bytes, but may also store a write count value corresponding to data of a larger size. An initial write count value may be "0000 0000h." The write count value of the write counter 112 may not be reset or decreased. The write count value of the write counter 112 may no longer increase after reaching "FFFF FFFFh" which is a maximum value. Therefore, when the write count value of the write counter 112 reaches the maximum value, the RPMB 110a may no longer store data, and the RPMB 110a operates as a read-only block.

The result register 113 may store a performance result of the operation performed on the RPMB 110a. For example, the result register 113 may store a result code indicating a result of the operation performed on the RPMB 110a. An example of the result code stored in the result register is shown in [Table 5] below.

TABLE 5

| Code | Description |
| --- | --- |
| 0000h (0080h) | Operation OK |
| 0000h (0081h) | General failure |
| 0000h (0082h) | Authentication failure MAC comparison not matching, MAC calculation failure |
| 0000h (0083h) | Counter failure Counters not matching in comparison, counter incrementing failure |
| 0000h (0084h) | Address failure Address out of range, wrong address alignment |
| 0000h (0085h) | Write failure Data/Counter/Result write failure |
| 0000h (0086h) | Read failure Data/Counter/Result read failure |
| 0007h | Authentication Key not yet programmed. This value is the only valid Result value until the Authentication Key has been programmed. Once the key is programmed, this value will no longer be used. |
| 0008h (0088h) | Secure Write Protect Configuration Block access failure Secure Write Protect Configuration read or write failure |
| 0009h (0089h) | Invalid Secure Write Protect Block Configuration parameter Invalid LUN or logical unit not enabled, DATA LENGTH, LOGICAL BLOCK ADDRESS, NUMBER OF LOGICAL BLOCKS, or overlapped areas |
| 000Ah (008Ah) | Secure Write Protection not applicable Logical unit configured with other write protection modes (permanent or power-on) |

In an embodiment, the authentication key 111, the write counter 112, and the result register 113 are independently included for each RPMB 110a and may have a unique value. In various embodiments, the RPMB 110a may be partitioned into a plurality of RPMB regions. The maximum number of RPMB regions included in the RPMB 110a may be four. Each RPMB region may have unique authentication key and write count value.

The RPMB data area may include an area that is used to store data only when authentication is passed. In an embodiment, a capacity of the RPMB data area may be a minimum of 128 Kbytes and a maximum of 16 Mbytes.

When performing the authenticated data write operation, the RPMB host controller 410 may provide the RPMB message to the RPMB device controller 210 according to a predetermined format. The RPMB message provided by the RPMB host controller 410 may include information necessary to perform authentication for the RPMB 110a. For example, the RPMB message may include authenticated data. The authenticated data may include the MAC generated by the RPMB host controller 410.

The RPMB device controller 210 may further include an authentication manager 211 and an access controller 212.

The authentication manager 211 may perform authentication using the authentication key 111 stored in the RPMB 110a. The authentication manager 211 may provide a performance result of the authentication to the access controller 212. The access controller 212 may store data in the RPMB 110a or prohibit storing data in the RPMB 110a according to the performance result of the authentication.

When the authentication is passed, the access controller 212 may control the RPMB 110a to store data to be stored in the RPMB 110a received from the host 400 in the RPMB data area. When the data is successfully stored, the access controller 212 may increase the write count value stored in the write counter 112 and store performance result of the authenticated data write operation in the result register 113.

When the authentication is failed, the access controller 212 may not store the data requested to be stored in the RPMB 110a in the RPMB data area. The access controller 212 may maintain the value of the write counter 112 and store information indicating that the authentication is failed in the result register 113.

When performing the authenticated data read operation, the RPMB host controller 410 may provide the RPMB message to the RPMB device controller 210 according to a predetermined format.

The access controller 212 may read the data stored in the RPMB 110a and generate the RPMB message to be provided to the RPMB host controller 410. The access controller 212 may generate metadata to be included in the RPMB message. The metadata may include part of information included in the RPMB message received from the RPMB host controller 410, the data read from the RPMB 110a, and a result code indicating a performance result of the authenticated data read operation. In an embodiment, the access controller 212 may generate the MAC which is authenticated data by using the authentication key 111 and the metadata stored in the RPMB 110a.

The access controller 212 may generate the RPMB message including the authenticated data and the metadata. The access controller 212 may provide the read data and the RPMB message to the RPMB host controller 410.

Figure 8:
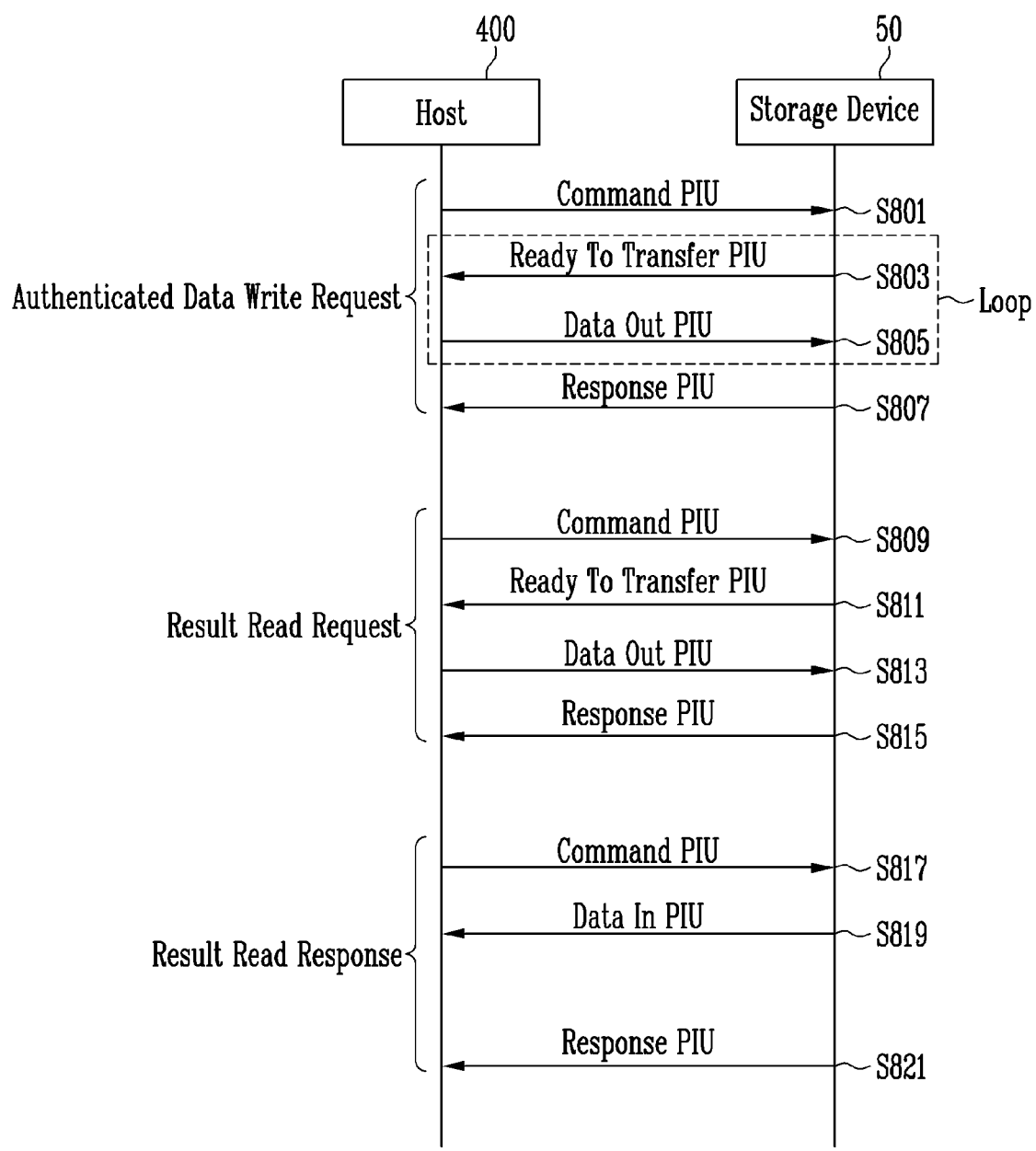
FIG. 8 is a flowchart illustrating an example of an authenticated data write operation performed in a normal RPMB mode.

FIG. 8 is a flowchart illustrating an example of the authenticated data write operation performed in the normal RPMB mode.

Referring to FIGS. 1 and 8, in the normal RPMB mode, the host 400 may transfer the command PIU three times to perform the authenticated data write operation, and the storage device 50 may transfer the response PIU three times.

Specifically, the authenticated data write operation may include transferring the RPMB messages of the authenticated data write request, the result read request, and the result read response through the PIU.

The authenticated data write request may be provided through operations S801 to S807, the result read request may be provided through operations S809 to S815, and the result read response may be provided through operations S817 to S821.

The authenticated data write request may be provided by transmitting, by the host 400, the RPMB message requesting to store data in the RPMB 110a and the data to be stored to the storage device 50.

The result read request may include a request for transferring the RPMB message requesting the value stored in the result register included in the RPMB 110a in which the performance result of the authenticated data write operation is stored, from the host 400 to the storage device 50.

The result read response may include a response in which the storage device 50 transfers the RPMB message providing the value of the result register to the host 400.

In operation S801, the host 400 may provide the command PIU to the storage device 50. The command PIU transferred in operation S801 may include a security protocol out command indicating that the host 400 will transmit data. In operation S803, the storage device 50 may provide the ready to transfer PIU to the host 400 in response to the command PIU received in operation S801. The ready to transfer PIU may include a PIU provided when the storage device 50 is ready to receive data to be provided by the host 400. In an embodiment, the ready to transfer PIU may include a PIU providing a message indicating that the storage device 50 is ready to receive the data out PIU.

In operation S805, the host 400 may provide the data out PIU to the storage device 50. The data out PIU provided by the host 400 may include the RPMB message corresponding to the authenticated data write request. The RPMB message transferred in operation S805 may include a stuff byte, authenticated data, and metadata. The metadata may include data to be stored in the RPMB 110a. Since FIG. 7 shows a case where the authenticated data write operation is performed in the normal RPMB mode, data may include a plurality of blocks having a size of 256 bytes. The RPMB message transferred in operation S805 is described in more detail with reference to FIG. 9 to be described later.

In operation S807, the storage device 50 may provide the response PIU to the host 400. The response PIU transmitted in operation S807 may include a response to the command PIU transmitted in operation S801.

In operation S809, the host 400 may provide the command PIU to the storage device 50. The command PIU transferred in operation S809 may include the security protocol out command indicating that the host 400 will transmit data. Thereafter, in operation S811, the storage device 50 may provide the ready to transfer PIU to the host 400 in response to the command PIU received in operation S809. The ready to transfer PIU may include a PIU provided when the storage device 50 is ready to receive data to be provided by the host 400. In an embodiment, the ready to transfer PIU may include a PIU providing a message indicating that the storage device 50 is ready to receive the data out PIU.

In operation S813, the host 400 may provide the data out PIU to the storage device 50. The data out PIU provided in operation S813 may include the RPMB message corresponding to the result read request. In an embodiment, the RPMB message included in the data out PIU provided in operation S813 is described in more detail with reference to FIG. 10 to be described later.

In operation S815, the storage device 50 may provide the response PIU to the host 400. The response PIU transmitted in operation S815 may include a response to the command PIU transmitted in operation S809.

In operation S817, the host 400 may provide the command PIU to the storage device 50. The command PIU provided in operation S817 may include a security protocol in command indicating a command requesting data and information from the storage device 50.

In operation S819, the storage device 50 may provide the data in PIU to the host 400. The data in PIU transferred in operation S819 may include the RPMB message corresponding to the result read response. The RPMB message transferred in operation S819 may include the stuff byte, the authenticated data, and the metadata. The metadata may include an updated write count value and the value of the result register indicating the performance result of the authenticated data write operation. The RPMB message transferred in operation S819 is described in more detail with reference to FIG. 11 to be described later.

In operation S821, the storage device 50 may provide the response PIU to the host 400. The response PIU transmitted in operation S821 may include a response to the command PIU transmitted in operation S817.

FIG. 9 is a diagram illustrating an example of the RPMB message provided through operation S805 of FIG. 8.

Referring to FIGS. 1, 8, and 9, the RPMB message corresponding to the authenticated data write request may include the stuff byte, the authenticated data, and the metadata.

The stuff byte may include a bit added to synchronize a predetermined data format or data communication. In an embodiment, a field corresponding to the stuff byte may be "0."

The authenticated data included in the RPMB message corresponding to the authenticated data write request may include the MAC generated by the RPMB host controller 410 described with reference to FIG. 7.

The metadata may include the data to be stored in the RPMB 110a, the nonce, the current write count value, the address corresponding to the data, the number of blocks of data (here one block is 256B), and the request message type indicating the RPMB message is the authenticated data write request. In an embodiment, a field corresponding to the nonce may be "0."

FIG. 10 is a diagram illustrating an example of the RPMB message provided through operation S813 of FIG. 8.

Referring to FIGS. 1, 8, and 10, the RPMB message corresponding to the result read request may include the stuff byte, the authenticated data, and the metadata.

In an embodiment, in the RPMB message corresponding to the result read request, only the request message type included in the metadata may have a value, and values of the remaining fields may be "0." The request message type may include a code value 0005h indicating that the RPMB message is the result read request.

FIG. 11 is a diagram illustrating an example of the RPMB message provided through operation S819 of FIG. 8.

Referring to FIGS. 1, 8, and 11, the RPMB message corresponding to the result read response may include the stuff byte, the authenticated data, and the metadata.

The stuff byte may include a bit added to synchronize a predetermined data format or data communication. In an embodiment, the field corresponding to the stuff byte may be "0."

The authenticated data included in the RPMB message corresponding to the result read response may include the MAC generated by the RPMB device controller 210 described with reference to FIG. 7.

Specifically, the access controller 212 may generate the metadata to be included in the RPMB message, and generate the MAC using the generated metadata and the authentication key 111 stored in the RPMB 110a.

The metadata may include the updated write count value, the address of data stored by the authenticated data write operation, the result code indicating the performance result of the authenticated data write operation, and "0300h" which is a response message type code indicating that the RPMB message is the authenticated data write response. Here, the address may include the same value as the address included in the RPMB message corresponding to the authenticated data write request described with reference to FIG. 9.

In an embodiment, the stuff byte, the data, the nonce, and the block count fields included in the RPMB message corresponding to the result read response may include "0."

Figure 12:
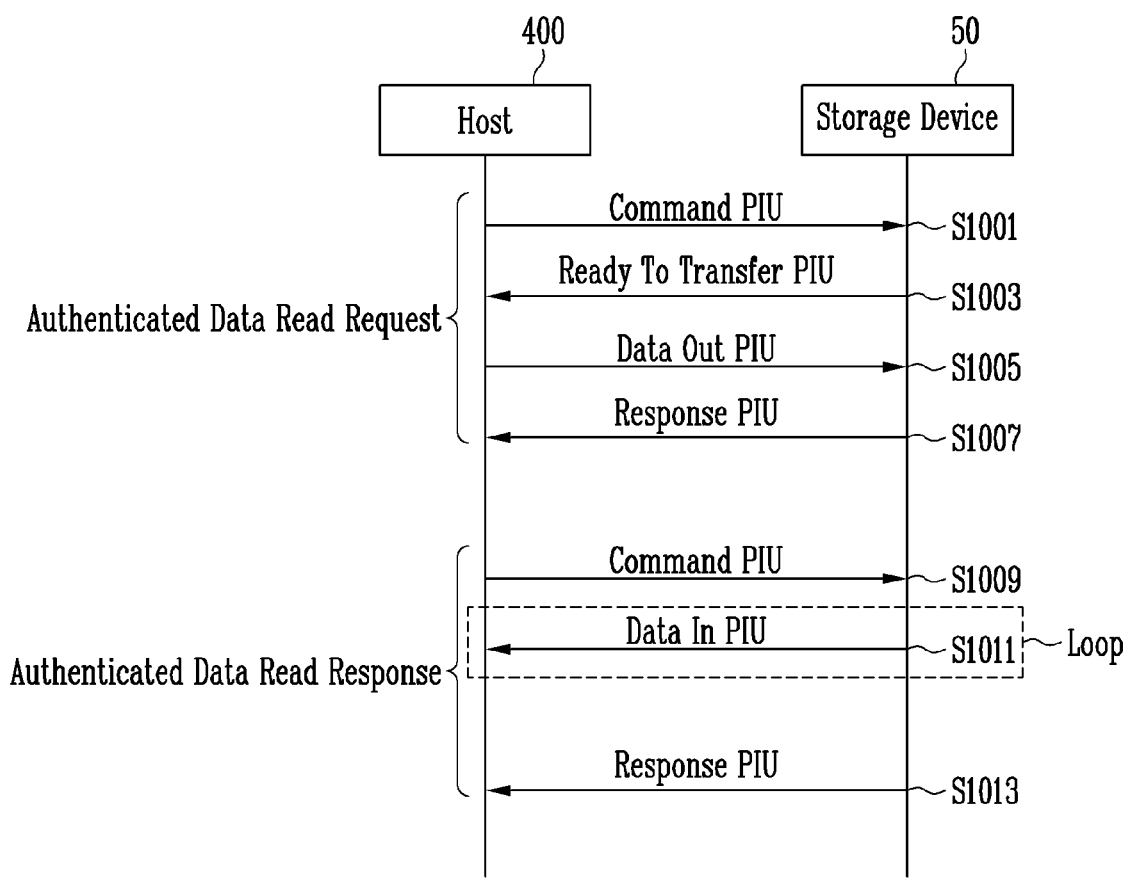
FIG. 12 is a flowchart illustrating an example of an authenticated data read operation performed in the normal RPMB mode.

FIG. 12 is a flowchart illustrating an example of the authenticated data read operation performed in the normal RPMB mode.

Referring to FIGS. 1 and 12, in the normal RPMB mode, the host 400 may transfer the command PIU twice to perform the authenticated data read operation, and the storage device 50 may transfer the responds PIU twice.

Specifically, the authenticated data read operation may include transferring the RPMB messages corresponding to each of the authenticated data read request and the authenticated data read response through the PIU.

The authenticated data read request may be performed through operations S1001 to S1007, and the authenticated data read response may be performed through operations S1009 to S1013.

The authenticated data read request includes a process in which the host 400 transfers the RPMB message indicating the read request for the data stored in the RPMB 110a to the storage device 50, and the authenticated data read response includes a process in which the storage device 50 transfers the data read from the RPMB 110a to the host 400.

In operation S1001, the host 400 may provide the command PIU to the storage device 50. The command PIU provided in operation S1001 may include the security protocol out command indicating that the host 400 will transmit data.

In operation S1003, the storage device 50 may provide the ready to transfer PIU to the host 400.

In operation S1005, the host 400 may provide the data out PIU to the storage device 50. The data out PIU provided in operation S1005 may include the RPMB message. Specifically, the RPMB message provided in operation S1005 may include the metadata. Here, the metadata includes the nonce generated by the host, the address to be read, the block count indicating the number of blocks of data to be read, and the request message type indicating that the RPMB message is the authenticated data read request. The RPMB message corresponding to the authenticated data read request is described in more detail with reference to FIG. 13 to be described later.

In operation S1007, the storage device 50 may provide the response PIU to the host 400. The response PIU provided by the storage device 50 may include a response to the command PIU transferred in operation S1001.

In operation S1009, the host 400 may provide the command PIU to the storage device 50. The command PIU provided in operation S1009 may include the security protocol in command indicating the command requesting data and information from the storage device 50.

In operation S1011, the storage device 50 may provide the data in PIU to the host 400. The data in PIU provided by the storage device 50 may include the RPMB message. Specifically, the RPMB message provided in operation S1011 may include the stuff byte, the authenticated data, and the metadata. Here, the authenticated data may include the MAC generated by the storage device 50. The metadata may include the data read from the RPMB 110a, the nonce, the address, the block count indicating the number of blocks of the read data, and the response message type indicating that the RPMB message is the authenticated data read response. The RPMB message corresponding to the authenticated data read response is described in more detail with reference to FIG. 14 to be described later.

In operation S1013, the storage device 50 may provide the response PIU to the host 400. The response PIU received by the host 400 in operation S1013 may include a response to the command PIU transferred in operation S1009.

FIG. 13 is a diagram illustrating an example of the RPMB message provided through operation S1005 of FIG. 12.

Referring to FIGS. 1, 12 and 13, the RPMB message corresponding to the authenticated data read request may include the metadata and the stuff byte without the authenticated data. The stuff byte may include a bit added to synchronize a predetermined data format or data communication. In an embodiment, the field corresponding to the stuff byte may be "0."

The metadata may include the nonce generated by the host, the address to be read, the block count indicating the number of blocks of the data to be read, and the request message type indicating that the RPMB message is the authenticated data read request.

In various embodiments, a value corresponding to each of the stuff byte, the MAC, the data, the write counter, and the result included in the RPMB message corresponding to the authenticated data read request may be "0."

FIG. 14 is a diagram illustrating an example of the RPMB message provided through operation S1011 of FIG. 12.

Referring to FIGS. 1, 12 and 14, the RPMB message corresponding to the authenticated data read response may include the authenticated data and the metadata. The authenticated data may include the MAC generated by the RPMB device controller 210 of the storage device 50. The metadata may include the data read from the RPMB 110a, the nonce, the address, the block count indicating the number of blocks of the read data, and the response message type indicating that the RPMB message is the authenticated data read response.

The nonce may be the nonce included in the RPMB message corresponding to the authenticated data read request transferred through operation S1005, that is, a value obtained by copying a nonce value generated by the host 400 as it is. The address and the block count of the read data may include the same value as the address to be read and the block count indicating the number of blocks of the data to be read included in the RPMB message corresponding to the authenticated data read request. The result may include the result code indicating the performance result of the authenticated data read operation. The response message type may include a code 0400h indicating that the RPMB message is the authenticated data read response.

The RPMB host controller 410 included in the host 400 may receive the RPMB message including the data read according to the authenticated data read operation, and then operate the MAC using the authentication key included in the RPMB host controller 410 and the metadata included in the RPMB message. Only when the MAC calculated by the RPMB host controller 410 and the MAC generated by the storage device 50 that is the authenticated data included in the RPMB message match, the RPMB host controller 410 may obtain the read data.

As described through FIGS. 8 to 14, in the authenticated data write operation and the authenticated data read operation in the normal RPMB mode, the command PIU for providing the data to be stored or the read data is provided once, but provision of an extra command PIU or the response PIU may be additionally required to transfer the RPMB message. This may cause a delay of a speed of access to the RPMB 110a, complexity of design, or others.

FIG. 15 is a diagram illustrating an example configuration of the command PIU.

FIG. 16 is a diagram illustrating an example configuration of the response PIU.

Referring to FIGS. 1, 15, and 16, the command PIU and the response PIU may include the basic header segment, the transaction specific field, the extra header segment, and the data segment. The basic header segment included in the command PIU and the response PIU includes the total extra header segment length (Total EHS Length) field. When the total extra header segment length (Total EHS Length) field has a value other than 0 (non-zero), the extra header segment field included in the command PIU and the response PIU may be used. The extra header segment may start from the byte address 32 of the PIU. The extra header segment may include an area that may additionally store data when sufficient information is not included in the basic header segment.

In the advanced RPMB mode, the host 400 and the storage device 50 may transfer the RPMB message using the extra header segment included in the command PIU and the response PIU. Specifically, the host 400 and the storage device 50 may set the total extra header segment length (Total EHS Length) field included in the basic header segments of the command PIU and the response PIU to a value other than 0 (non-zero), and transmit the RPMB message by including the RPMB message in the extra header segment.

Figure 17:
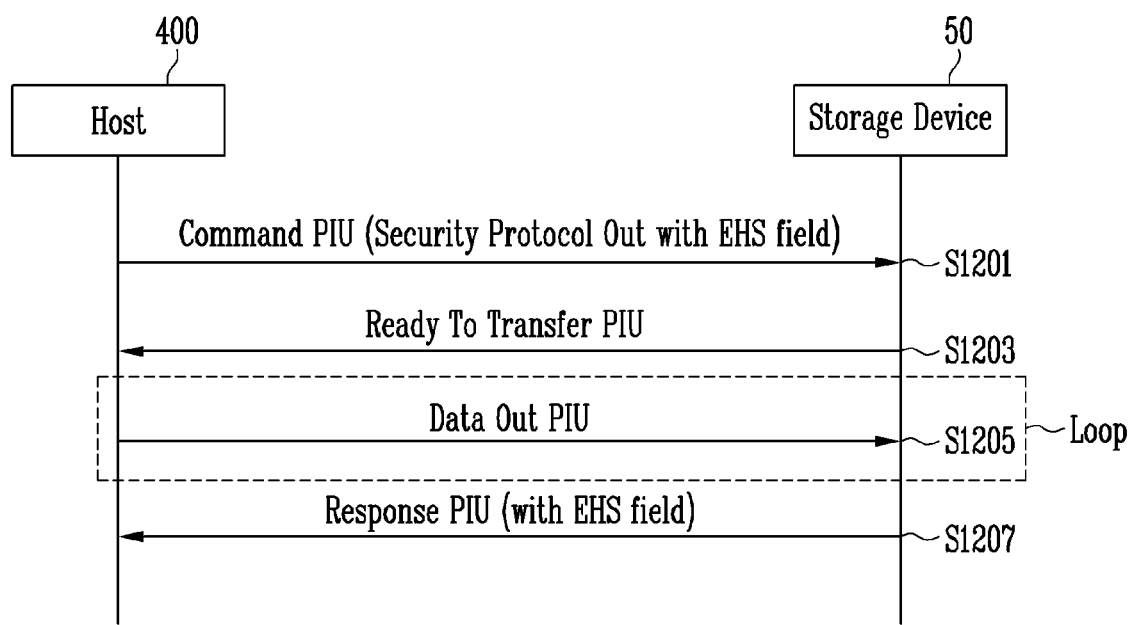
FIG. 17 is a flowchart illustrating an example of an authenticated data write operation performed in an advanced RPMB mode.

FIG. 17 is a flowchart illustrating an example of the authenticated data write operation performed in the advanced RPMB mode. Referring to FIGS. 1 and 17, in operation S1201, the host 400 may provide the command PIU to the storage device 50. The command PIU may include the RPMB message in the extra header segment. The command PIU may include the security protocol out command indicating that the host 400 will transmit data. The RPMB message transferred in operation S1201 is described in more detail in the description of FIG. 18 to be described later.

In operation S1203, the storage device 50 may provide the ready to transfer PIU to the host 400 in response to the command PIU received in operation S1201.

In operation S1205, the host 400 may provide the data out PIU to the storage device 50. Since the host 400 has already provided the RPMB message to the storage device 50 by including the RPMB message in the extra header segment of the command PIU in operation S1201, the data out PIU transferred in operation S1205 may does not include the RPMB message and may include only the data to be stored in the RPMB 110a.

In operation S1207, the storage device 50 may provide the response PIU to the host 400. The response PIU provided by the storage device 50 may include the RPMB message. The RPMB message may be included in the extra head segment of the response PIU.

FIG. 18 is a diagram illustrating an example structure of the command PIU transferred in operation S1201 of FIG. 17.

Referring to FIG. 18, the command PIU transferred in operation S1201 may include the PIU using the extra header segment, unlike the command PIU transferred in the embodiment described with reference to FIGS. 8 to 14. Therefore, a field indicating total extra header segment length information included in the basic header segment may be set to a value other than zero (non-zero) 02h.

The extra header segment of the command PIU transferred in operation S1201 may include the RPMB message. The RPMB message included in the extra header segment may include some data of the RPMB message corresponding to the authenticated data write request described with reference to FIG. 9.

Specifically, the extra header segment of the command PIU may include the authenticated data and the metadata. Unlike the RPMB message of FIG. 9, the metadata included in the extra header segment may not include the data to be stored in the RPMB 110a. The metadata may include the nonce generated by the host, the current write count value, the address corresponding to the data, the number of blocks of data (here one block is 4 KB), and the request message type indicating that the RPMB message is the authenticated data write request (0003h). The authenticated data may include the MAC generated by the RPMB host controller 410 described with reference to FIG. 7.

Figure 19:
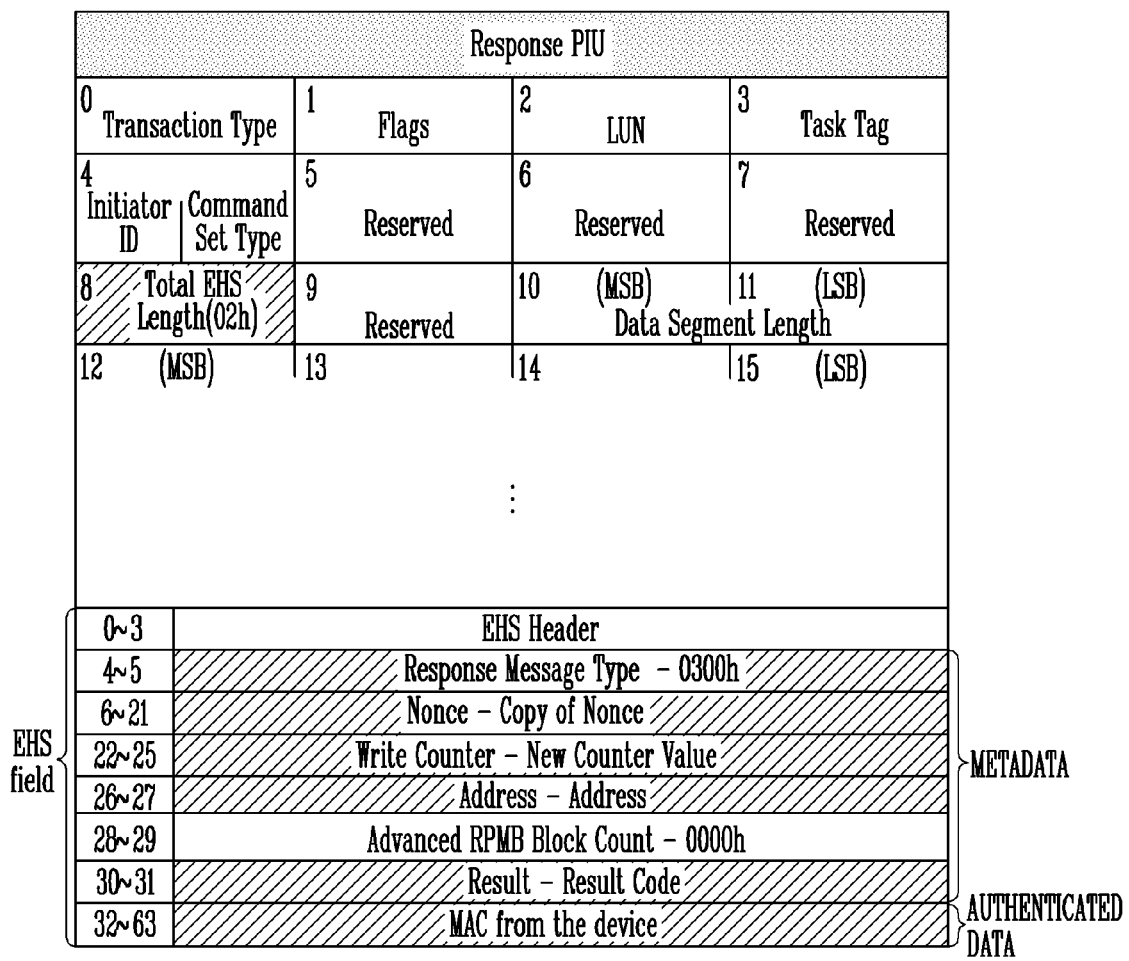
FIG. 19 is a diagram illustrating an example structure of a response PIU transferred in operation S1207 of FIG. 17.

FIG. 19 is a diagram illustrating an example structure of the response PIU transferred in operation S1207 of FIG. 17.

Referring to FIG. 19, the response PIU transferred in operation S1207 may include the PIU using the extra header segment, unlike the response PIU transferred in the embodiment described with reference to FIGS. 8 to 14. Therefore, the field indicating the total extra header segment length information included in the basic header segment may be set to a value 02h other than 0 (non-zero).

The extra header segment of the response PIU transferred in operation S1207 may include the RPMB message. The RPMB message included in the extra header segment may include some data of the RPMB message corresponding to the result read response described with reference to FIG. 11.

Specifically, the extra header segment of the response PIU may include the authenticated data and the metadata. The metadata may include the write count value of the write counter updated according to the performance of the authenticated data write operation, the address of the data stored by the authenticated data write operation, the result code indicating the performance result of the authenticated data write operation, and the response message type indicating that the RPMB message is the authenticated data write response. Here, the address may include the same value as the address included in the RPMB message corresponding to the authenticated data write request described with reference to FIG. 18. The nonce may be a value obtained by copying the nonce included in the RPMB message corresponding to the authenticated data write request described with reference to FIG. 18. The authenticated data may include the MAC generated by the RPMB device controller 210 described with reference to FIG. 7 using the metadata and the authentication key stored in the RPMB 110a.

Figure 20:
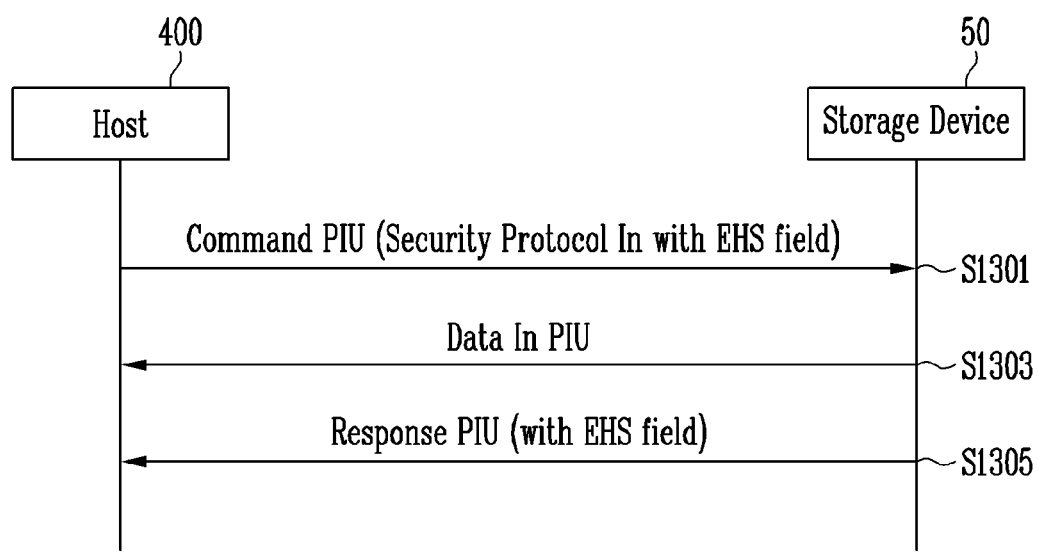
FIG. 20 is a flowchart illustrating the authenticated data read operation performed in the advanced RPMB mode.

FIG. 20 is a flowchart illustrating the authenticated data read operation performed in the advanced RPMB mode.

Referring to FIGS. 1 and 20, in operation S1301, the host 400 may provide the command PIU to the storage device 50. The command PIU may include the RPMB message in the extra header segment. The command PIU may include a security protocol in command indicating that the host 400 requests transferal of data to the storage device 50. The RPMB message transferred in operation S1301 is described in more detail in the description of FIG. 21 to be described later.

In operation S1303, the storage device 50 may read the data stored in the RPMB 110a using the RPMB message included in the command PIU received in operation S1301, and provide the data in PIU including the read data to the host 400. Since the host 400 has already provided the RPMB message to the storage device 50 by including the RPMB message in the extra header segment of the command PIU in operation S1301, the data in PIU transferred in operation S1303 may not include the RPMB message and may include only the data read from the RPMB 110a.

In operation S1305, the storage device 50 may provide the response PIU to the host 400. The response PIU provided by the storage device 50 may include the RPMB message. The RPMB message may include included in the extra head segment of the response PIU. The RPMB message provided by the storage device 50 to the host 400 in operation S1305 is described in more detail with reference to FIG. 22 to be described later.

FIG. 21 is a diagram illustrating an example structure of the command PIU transferred in operation S1301 of FIG. 20.

Referring to FIGS. 1, 7, 20 and 21, the command PIU transferred in operation S1301 may include the PIU using the extra header segment, unlike the command PIU transferred in the embodiment described with reference to FIGS. 8 and 12. Therefore, the field indicating the total extra header segment length information included in the basic header segment may be set to a value 02h other than 0 (non-zero).

The extra header segment of the command PIU transferred in operation S1301 may include the RPMB message. The RPMB message included in the extra header segment may include some or all of data included in the RPMB message corresponding to the authenticated data read request described with reference to FIG. 13.

Specifically, the extra header segment of the command PIU may include the authenticated data and the metadata. In an embodiment, the command PIU may include only the metadata without the authenticated data. The metadata may include the nonce generated by the host, the address to be read, the advanced RPMB block count indicating the number of blocks of data to be read (here one block is 4 KB), and 0004h which is the request message type indicating that the RPMB message included in the extra header segment is the authenticated data read request. In an embodiment, a value corresponding to each of the MAC, the write counter, and the result included in the RPMB message included in the extra header segment may be "0."

Figure 22:
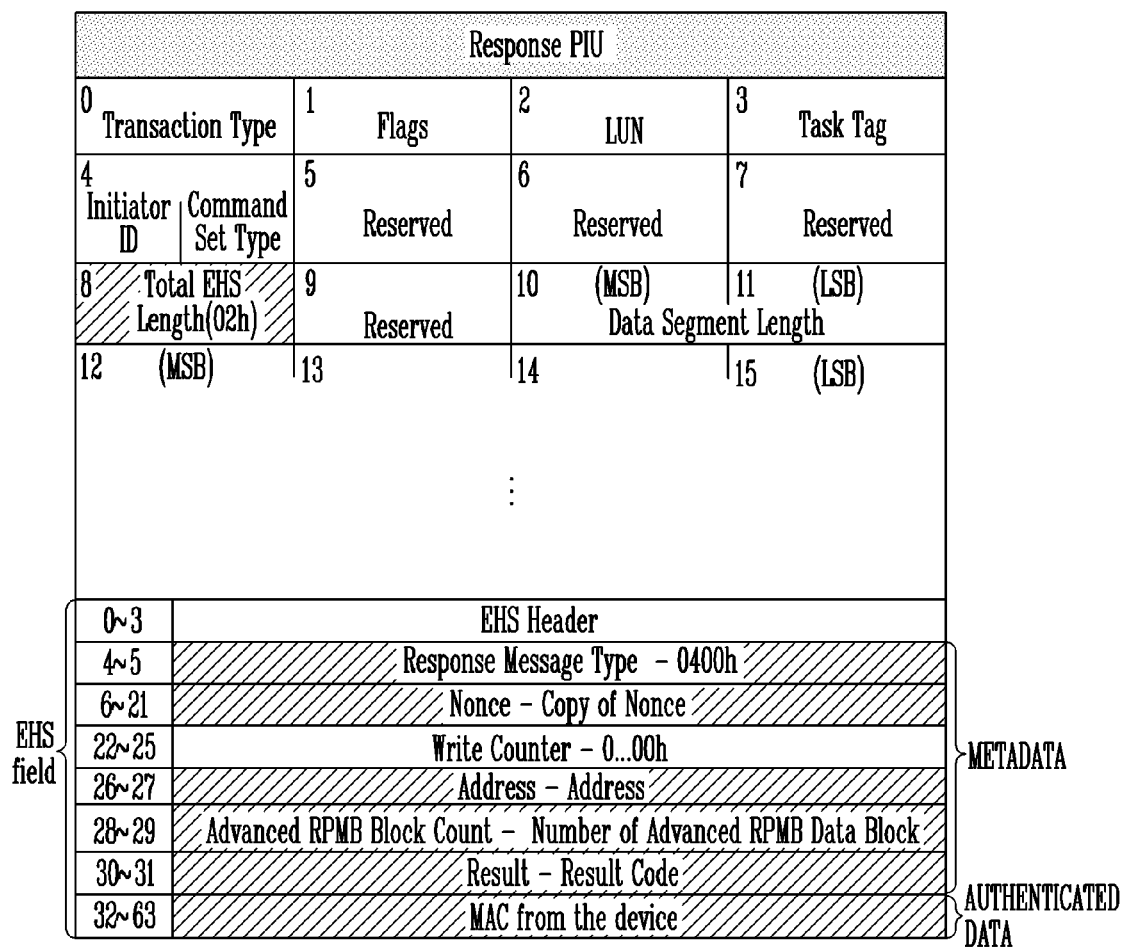
FIG. 22 is a diagram illustrating an example structure of a response PIU transferred in operation S1305 of FIG. 20.

FIG. 22 is a diagram illustrating an example structure of the response PIU transferred in operation S1305 of FIG. 20.

Referring to FIGS. 1, 7, and 22, the response PIU transferred in operation S1305 may include the PIU using the extra header segment unlike the response PIU transferred in the embodiment described with reference to FIGS. 8 to 14. Therefore, the field indicating the total extra header segment length information included in the basic header segment may be set to a value 02h other than 0 (non-zero).

The extra header segment of the response PIU transferred in operation S1305 may include the RPMB message. The RPMB message included in the extra header segment may include the RPMB message corresponding to the authenticated data read response described with reference to FIG. 14. The extra header segment may include the authenticated data and the metadata. The authenticated data may include the MAC generated by the RPMB device controller 210 of the storage device 50. The metadata may include the data read from the RPMB 110a, the nonce, the address, the advanced RPMB block count indicating the number of blocks of the read data, and the response message type indicating that the RPMB message is the authenticated data read response.

The nonce may be the nonce included in the RPMB message corresponding to the authenticated data read request transferred through operation S1301, that is, a value obtained by copying the nonce value generated by the host 400 as it is. The address and the block count of the read data may include the same value as the address to be read and the block count indicating the number of blocks of the data to be read included in the RPMB message corresponding to the authenticated data read request. The result may include the result code indicating the performance result of the authenticated data read operation. The response message type may include a code 0400h indicating that the RPMB message is the authenticated data read response.

The RPMB host controller 410 included in the host 400 may receive the data read according to the authenticated data read operation in operation S1303, and in operation S1305, after receiving the RPMB message corresponding to the authenticated data read response, the RPMB host controller 410 may operate the MAC using the authentication key included in the RPMB host controller 410 and the metadata included in the RPMB message. Only when the MAC calculated by the RPMB host controller 410 and the MAC generated by the storage device 50 which is the authenticated data included in the RPMB message match, the RPMB host controller 410 may obtain the read data.

According to the embodiment described with reference to FIGS. 17 to 22, in the advanced RPMB mode, since the RPMB message is included in the extra header segment and transmitted, unlike the normal RPMB mode, transmission through the data in PIU or the data out PIU is not required. Therefore, in the advanced RPMB mode, since the number of PIUs to be transmitted is less than that in the normal RPMB mode, in the advanced RPMB mode, the RPMB 110*a* may be accessed at a speed faster than that of the normal RPMB mode.

Figure 23:
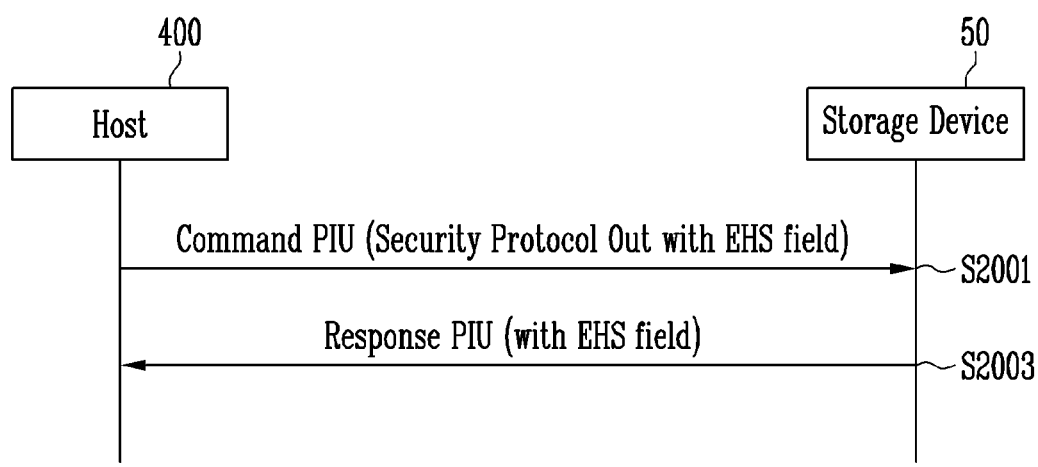
FIG. 23 is a flowchart illustrating an example of an authentication key programming operation performed in the advanced RPMB mode.

FIG. 23 is a flowchart illustrating an example of an authentication key programming operation performed in the advanced RPMB mode.

FIG. 24 is a diagram illustrating an example of the command PIU provided in the authentication key programming operation.

Figure 25:
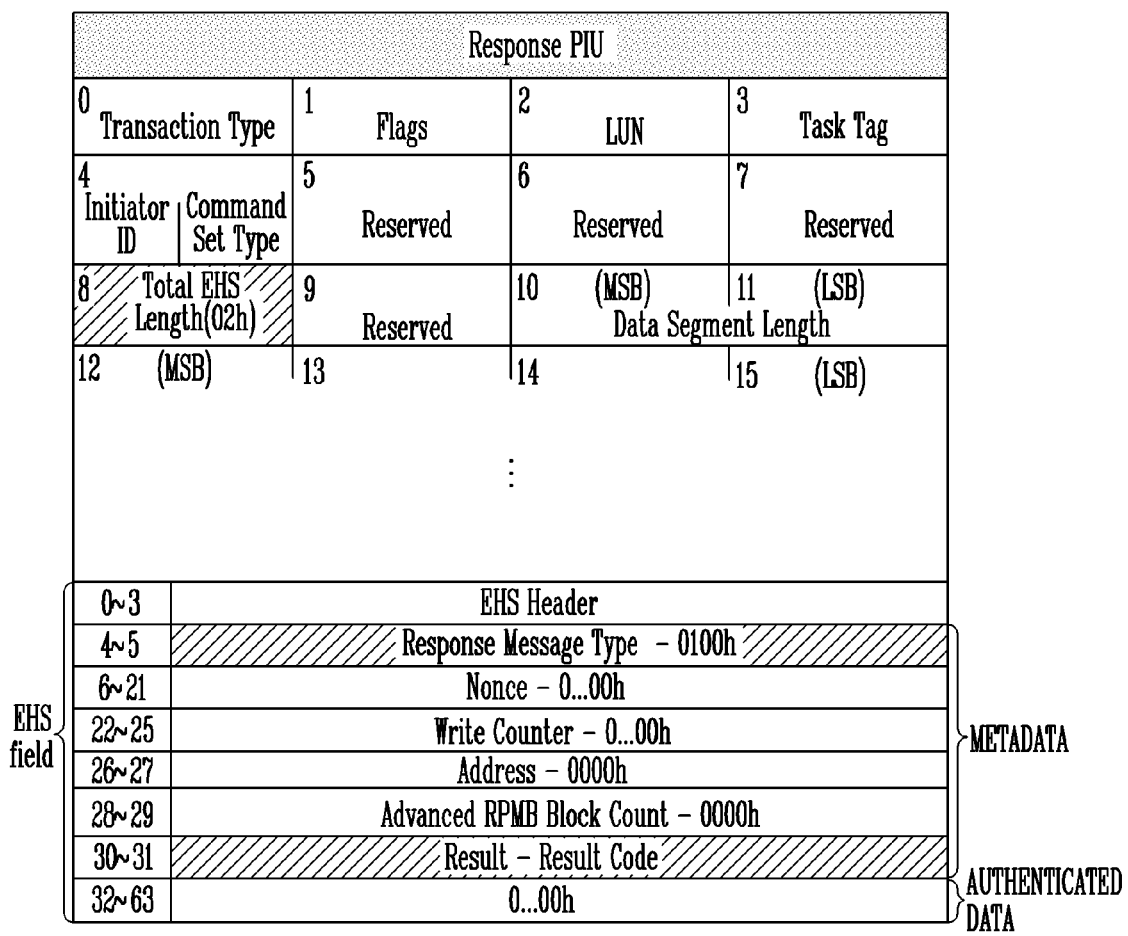
FIG. 25 is a diagram illustrating an example of a response PIU provided in the authentication key programming operation.

FIG. 25 is a diagram illustrating an example of the response PIU provided in the authentication key programming operation.

Referring to FIGS. 23 to 25, the host 400 may perform the authentication key programming operation of storing the authentication key in the RPMB 110*a* included in the storage device 50 only once for the first time. In the authentication key programming operation, the host 400 may provide an authentication key programming request to the storage device 50. Specifically, the host 400 may provide the command PIU including the RPMB message corresponding to the authentication key programming request to the storage device 50.

The storage device 50 may obtain the authentication key included in the RPMB message corresponding to the authentication key programming request provided by the host 400, and store the authentication key in the RPMB 110*a*. The storage device 50 may provide an authentication key programming response to the host 400 in response to the authentication key programming request.

In an embodiment, the authentication key programming operation may be performed in any one of the normal RPMB mode and the advanced RPMB mode. In the authentication key programming operation performed in the normal RPMB mode, the RPMB message may be transmitted/received between the host 400 and the storage device 50 in each of operation S805, operation S813, and operation S819 in a method similar to that of the authenticated data write operation described with reference to FIG. 8.

When performing the authentication key programming operation in the advanced RPMB mode, the PIU transmitted between the host 400 and the storage device 50 may include the RPMB message in the extra header segment.

In operation S2001, the host 400 may provide the command PIU to the storage device 50. Referring to FIG. 24, the command PIU provided in operation S2001 may include the RPMB message in the extra header segment. Therefore, the total extra header segment length (Total EHS Length) field included in the command PIU provided in operation S2001 may have a value 02h other than 0 (non-zero). The extra header segment may include the metadata and the authenticated data. The authenticated data may include a key value Key corresponding to the authentication key to be stored in the RPMB 110*a* described with reference to FIG. 1. The metadata may include the request message type 0001h indicating that the RPMB message included in the command PIU is the authentication key programming request.

The storage device 50 may store the key value Key included in the authenticated data in the RPMB 110*a* described with reference to FIG. 7 in response to the command PIU.

In operation S2003, the storage device 50 may provide the response PIU to the host 400. Referring to FIG. 25, the response PIU provided in operation S2003 may include the RPMB message in the extra header segment. Therefore, the total extra header segment length (Total EHS Length) field included in the response PIU provided in operation S2003 may have a value 02h other than 0 (non-zero). The extra header segment may include the metadata. The metadata may include the response message type 0100h indicating that the RPMB message included in the extra header segment of the response PIU is the authentication key programming response and a result indicating a performance result of the authentication key programming operation. In an embodiment, the result may include a result code that is a result code that is the performance result of the authentication key programming operation stored in the result register 113.

Figure 26:
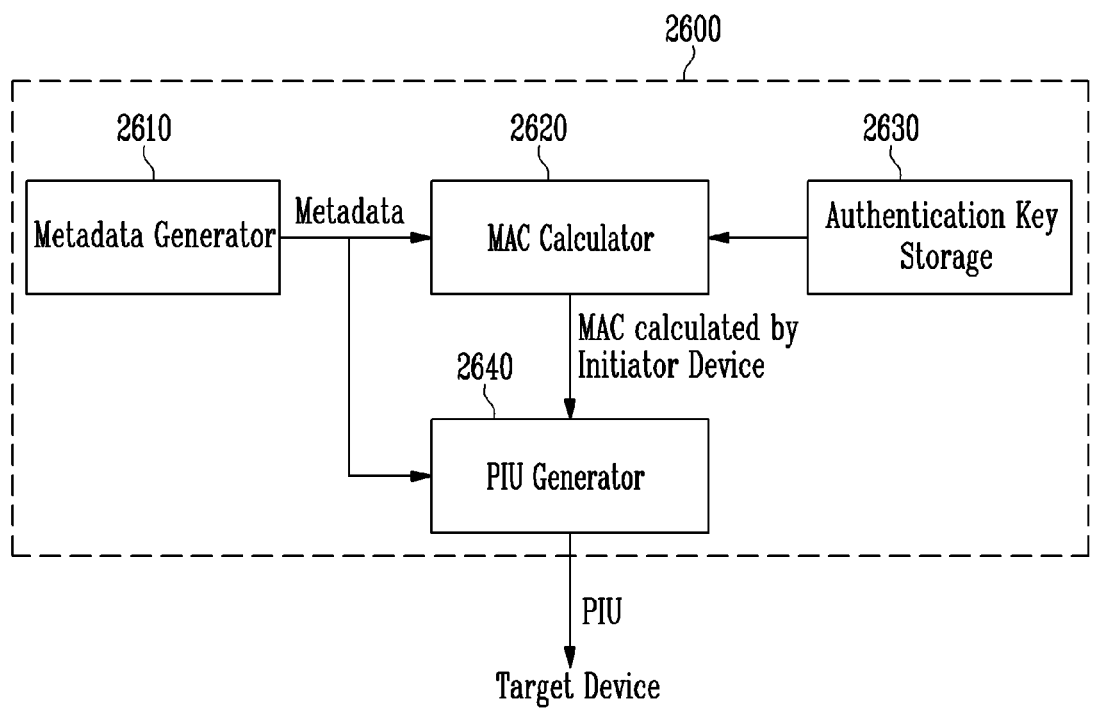
FIG. 26 is a diagram illustrating an example of a PIU transmitter 2600 included in an initiator device.

FIG. 26 is a diagram illustrating an example of a PIU transmitter 2600 included in the initiator device.

Referring to FIGS. 7 and 26, the host 400 and the storage device 50 may perform an operation related to the RPMB 110*a* while transmitting/receiving the PIU. In performing the authenticated data write operation, the authenticated data read operation, and the authentication key programming operation described through FIGS. 8 to 25, both of the RPMB host controller 410 and the RPMB device controller 210 may generate the PIU, and transmit the generated PIU or receive the PIU transmitted from a counterpart, to perform authentication. Therefore, the RPMB host controller 410 and the RPMB device controller 210 may include both of the PIU transmitter 2600 and a PIU receiver 2700 described with reference to FIG. 27 to be described later.

A device generating the PIU may include the initiator device. A device receiving the generated PIU may include the target device. When the RPMB host controller 410 provides the PIU to the RPMB device controller 210, the host 400 may include the initiator device and the storage device 50 may include the target device. Conversely, when the RPMB device controller 210 provides the PIU to the RPMB host controller 410, the storage device 50 may include the initiator device, and the host 400 may include the target device.

The PIU transmitter 2600 may include a MAC calculator 2620, an authentication key storage 2630, a metadata generator 2610, and a PIU generator 2640.

The authentication key storage 2630 may store the authentication key. The authentication key storage 2630 may correspond to the authentication key 111 included in the RPMB 110a described with reference to FIG. 7. The authentication key may be stored in the RPMB 110a according to the authentication key programming operation described with reference to FIGS. 23 to 25. Since the authentication key is used to generate the MAC when performing the authenticated data write operation and the authenticated data read operation, the authentication key is required to be stored in the RPMB 110a before performing the authenticated data write operation and authenticated data read operation. The metadata generator 2610 may generate the metadata. The metadata may be included in the RPMB message. The metadata may include different components according to a type of the RPMB message. The components that may be included in the metadata may include at least one of the write count value, the request message type, the response message type, the result, the address, the nonce, the data, the advanced RPMB data, the block count, and the advanced RPMB block count described with reference to FIG. 6.

The metadata generator 2610 may provide the generated metadata to the MAC calculator 2620 and the PIU generator 2640.

The MAC calculator 2620 may generate the MAC using the metadata and the authentication key stored in the authentication key storage 2630. Specifically, the MAC calculator 2620 may generate the MAC using a hash-based message authentication code (HMAC SHA-256). The generated MAC may be used by the target device to perform authentication. The MAC may have a length of 256 bits (32 bytes). The authentication key used to generate the MAC may be 256 bits. However, the sizes of the MAC and the authentication key are not limited based on some embodiments of the disclosed technology. The MAC calculator 2620 may provide the generated MAC to the PIU generator 2640.

The PIU generator 2640 may generate the PIU to be provided to the target device. Specifically, the PIU generator 2640 may generate the RPMB message including the authenticated data and the metadata. The authenticated data may include the MAC generated by the MAC calculator 2620. In an embodiment, the authenticated data included in the RPMB message corresponding to the authentication key programming request provided in the authentication key programming operation may be the authentication key itself.

In the normal RPMB mode, the PIU generator 2640 may provide the generated RPMB message to the target device through the data in PIU or the data out PIU.

In the advanced RPMB mode, the PIU generator 2640 may generate the PIU including the RPMB message in the extra header segment, and provide the generated PIU to the target device. In the advanced RPMB mode, the total extra header segment length field in the basic header segment of the PIU including the RPMB message may include a value other than 0 (non-zero).

Figure 27:
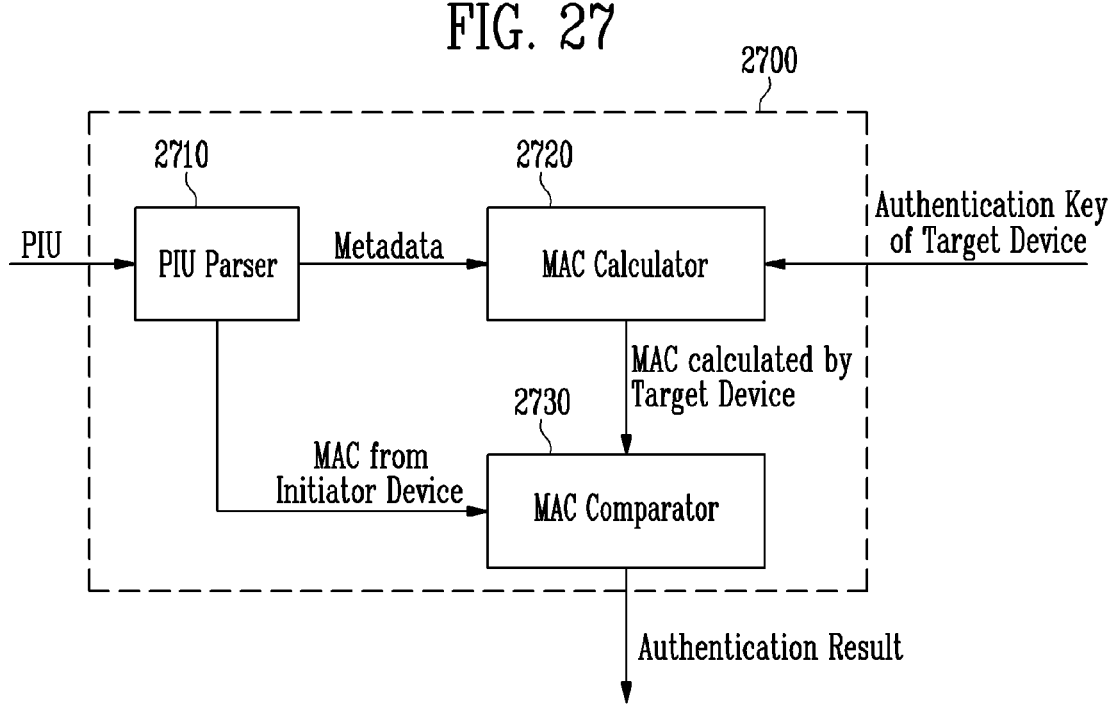
FIG. 27 is a diagram illustrating an example of a PIU receiver 2700 included in a target device.

FIG. 27 is a diagram illustrating an example of the PIU receiver 2700 included in the target device.

Referring to FIGS. 8 and 27, the host 400 and the storage device 50 may perform the operation related to the RPMB 110a while transmitting/receiving the PIU. In the process of performing the authenticated data write operation, the authenticated data read operation, and the authentication key programming operation described through FIGS. 8 to 25, both of the RPMB host controller 410 and the RPMB device controller 210 may generate the PIU, and transmit the generated PIU or receive the PIU transmitted from a counterpart, to perform authentication. Therefore, the RPMB host controller 410 and the RPMB device controller 210 may include both of the PIU transmitter 2600 described with reference to FIG. 26 and the PIU receiver 2700.

The device generating the PIU may be the initiator device. The device receiving the generated PIU may be the target device. When the RPMB host controller 410 provides the PIU to the RPMB device controller 210, the host 400 may be the initiator device and the storage device 50 may be the target device. Conversely, when the RPMB device controller 210 provides the PIU to the RPMB host controller 410, the storage device 50 may be the initiator device, and the host 400 may be the target device.

The PIU receiver 2700 may include a PIU parser 2710, a MAC calculator 2720, and a MAC comparator 2730. The PIU parser 2710 may receive the PIU provided by the initiator device. The PIU received by the PIU parser 2710 may include the data in PIU or the data out PIU in the normal RPMB mode. The PIU received by the PIU parser 2710 may include the command PIU or the response PIU in the advanced RPMB mode.

The PIU parser 2710 may obtain the RPMB message by parsing the received PIU, and may obtain the metadata and the authenticated data included by parsing the RPMB message. In an embodiment, the metadata may include different components according to the type of the RPMB message. The components that may be included in the metadata may include at least one of the write count value, the request message type, the response message type, the result, the address, the nonce, the data, the advanced RPMB data, the block count, and the advanced RPMB block count described with reference to FIG. 6.

The authenticated data may be the MAC generated by the initiator device. In an embodiment, the authenticated data included in the RPMB message corresponding to the authentication key programming request provided in the authentication key programming operation may be the authentication key itself.

The MAC calculator 2720 may obtain the authentication key previously stored in the target device. The authentication key previously stored in the target device may include the same value as the authentication key stored in the initiator device.

The MAC calculator 2720 may calculate the MAC using the metadata received from the PIU parser 2710 and the authentication key previously stored in the target device. For example, the MAC calculator 2720 may calculate the MAC using a hash-based message authentication code (HMAC SHA-256). The MAC calculator 2720 may provide the calculated MAC to the MAC comparator 2730.

The MAC comparator 2730 may compare whether the MAC received from the PIU parser 2710 and the MAC received from the MAC calculator 2720 match, and may output an authentication result according to a comparison result. The authentication result may be used to perform the authenticated data write operation and the authenticated data read operation, which are operations on the RPMB.

As a result, when the authentication keys stored in the initiator device and the target device are different, or the metadata used for calculating the MAC are different, the authentication may be failed, and only when the authentication keys stored in the initiator device and the target device are the same and the metadata used for calculating the MAC are the same, the authentication may be successful. Therefore, the RPMB 110a may provide a data storage function that provides high security.

Figure 28:
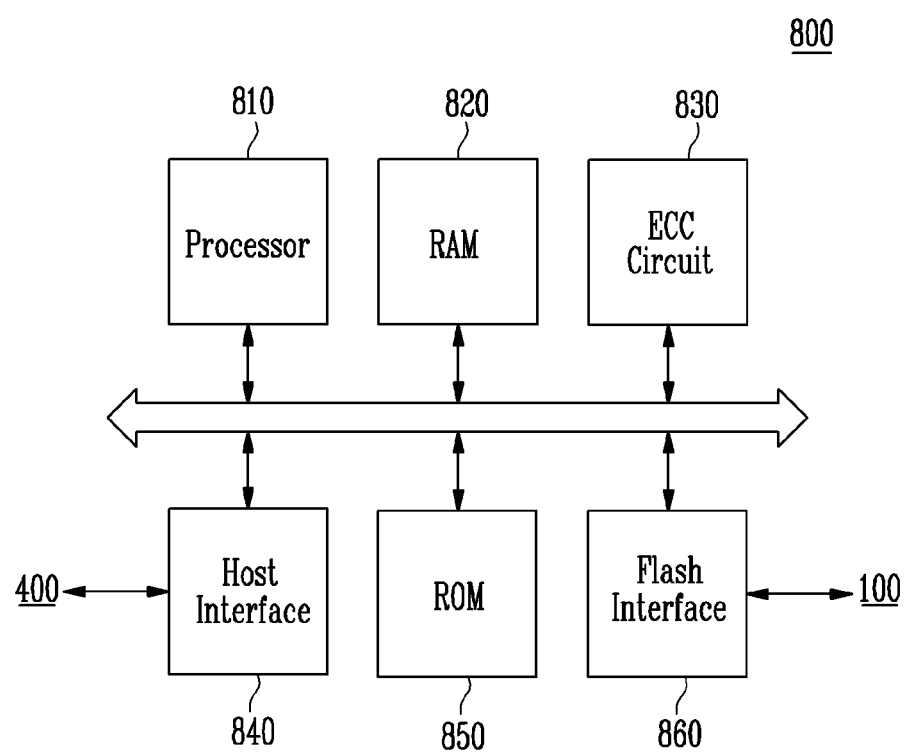
FIG. 28 is a diagram illustrating another example of a memory controller of FIG. 1.

FIG. 28 is a diagram illustrating another example of the memory controller of FIG. 1.

Referring to FIG. 28, the memory controller 800 may include a processor 810, a RAM 820, an error correction circuit 830, a host interface 840, a ROM 850, and a flash interface 860.

The processor 810 may control an overall operation of the memory controller 800. The RAM 820 may be used as a buffer memory, a cache memory, an operation memory, and other types of memory devices of the memory controller 800.

The ROM 850 may store various information required for the memory controller 800 to operate in a firmware form.

The memory controller 800 may communicate with an external device (for example, the host 400, an application processor, and the like) through the host interface 840.

The memory controller 800 may communicate with the memory device 100 through the flash interface 860. The memory controller 800 may transmit a command CMD, an address ADDR, and a control signal CTRL to the memory device 100 through the flash interface 860 and receive data DATA. For example, the flash interface 860 may include a NAND interface.

Figure 29:
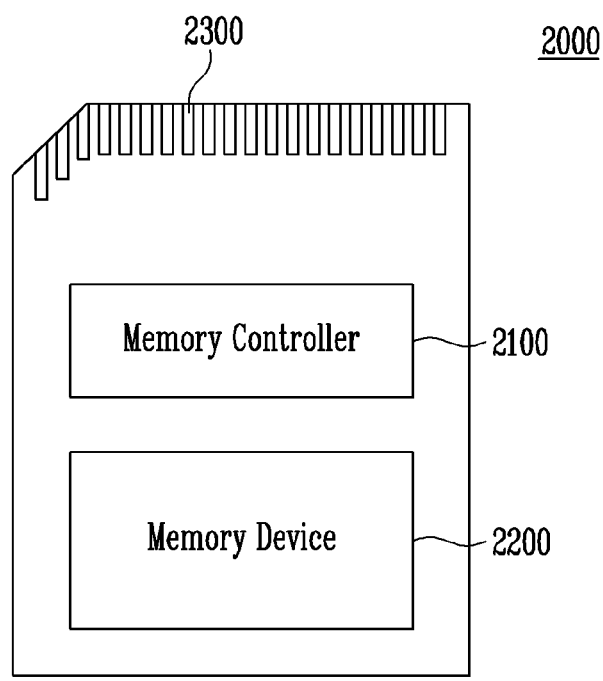
FIG. 29 is a block diagram illustrating an example of a memory card system that includes a storage device based on some embodiments of the disclosed technology.

FIG. 29 is a block diagram illustrating an example of a memory card system that includes a storage device based on some embodiments of the disclosed technology.

Referring to FIG. 29, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 may be configured to control read, program, erase, and background operations of the memory device 2200. The memory controller 2100 is configured to provide an interface between the memory device 2200 and a host. The memory controller 2100 is configured to perform firmware operations for controlling the memory device 2200. The memory controller 2100 may be implemented equally to the memory controller 200 described with reference to FIG. 1.

For example, the memory controller 2100 may include components such as a random access memory (RAM), a processor, a host interface, a memory interface, and an error corrector.

The memory controller 2100 may communicate with an external device through the connector 2300. The memory controller 2100 may communicate with an external device (for example, the host) according to a specific communication standard. For example, the memory controller 2100 is configured to communicate with an external device through at least one of various communication standards such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 2300 may be defined by at least one of the various communication standards described above.

For example, the memory device 2200 may be configured of various nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-transfer torque magnetic RAM (STT-MRAM).

The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 30:
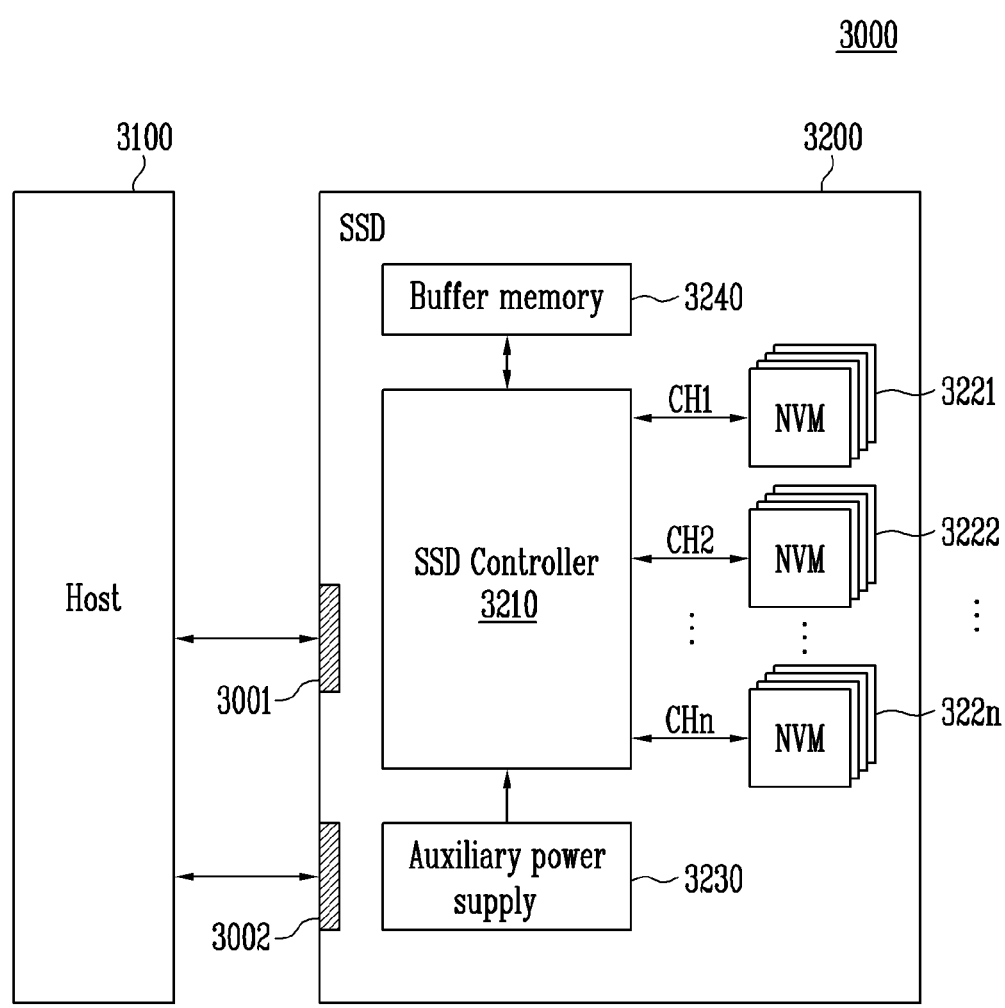
FIG. 30 is a block diagram illustrating a solid state drive (SSD) system that includes a storage device based on some embodiments of the disclosed technology.

FIG. 30 is a block diagram illustrating an example of a solid state drive (SSD) system that includes a storage device based on some embodiments of the disclosed technology.

Referring to FIG. 30, the SSD system 3000 includes a host 3100 and an SSD 3200. The SSD 3200 exchanges a signal with the host 3100 through a signal connector 3001 and receives power through a power connector 3002. The SSD 3200 includes an SSD controller 3210, a plurality of flash memories 3221 to 322n, an auxiliary power supply 3230, and a buffer memory 3240.

In some embodiments of the disclosed technology, the SSD controller 3210 may perform the function of the memory controller 200 described with reference to FIG. 1.

The SSD controller 3210 may control the plurality of flash memories 3221 to 322n in response to the signal received from the host 3100. For example, the signal may include signals based on an interface between the host 3100 and the SSD 3200. For example, the signal may include a signal defined by at least one of interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power supply 3230 is connected to the host 3100 through the power connector 3002. The auxiliary power supply 3230 may receive the power from the host 3100 and may charge the power. The auxiliary power supply 3230 may provide power of the SSD 3200 when power supply from the host 3100 is not smooth. For example, the auxiliary power supply 3230 may be positioned in the SSD 3200 or may be positioned outside the SSD 3200. For example, the auxiliary power supply 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store metadata (for example, a mapping table) of the flash memories 3221 to 322n. The buffer memory 3240 may include a volatile memory such as a DRAM, an SDRAM, a DDR SDRAM, an LPDDR SDRAM, and a GRAM, or a nonvolatile memory such as an FRAM, a ReRAM, an STT-MRAM, and a PRAM.

Figure 31:
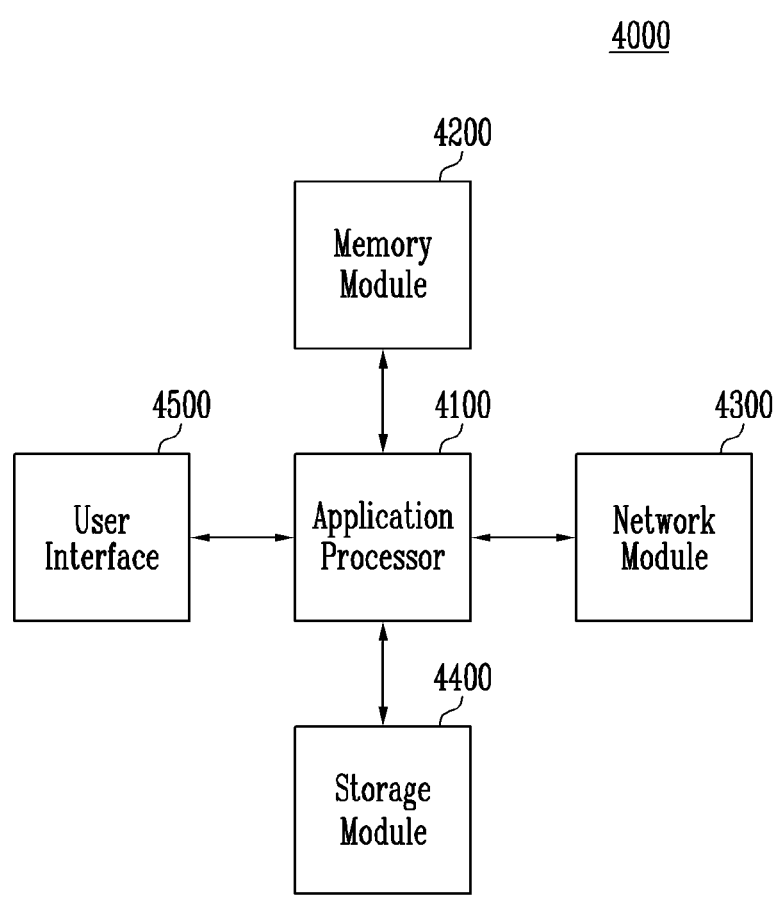
FIG. 31 is a block diagram illustrating a user system that includes a storage device based on some embodiments of the disclosed technology.

FIG. 31 is a block diagram illustrating an example of a user system that includes the storage device based on some embodiments of the disclosed technology.

Referring to FIG. 31, the user system 4000 includes an application processor 4100, a memory module 4200, a network module 4300, a storage module 4400, and a user interface 4500.

The application processor 4100 may perform the operations associated with the components in the user system 4000, an operating system (OS), a user program, or others included in the user system 4000. For example, the application processor 4100 may include controllers, interfaces, graphics engines, and others that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a nonvolatile random access memory, such as a PRAM, a ReRAM, an MRAM, and an FRAM. For example, the application processor 4100 and memory module 4200 may be packaged based on a package on package (POP) and provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, Wimax, WLAN, UWB, Bluetooth, and Wi-Fi. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented with a nonvolatile semiconductor memory element such as a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a plurality of nonvolatile memory devices, and the plurality of nonvolatile memory devices may operate identically to the memory device 100 described with reference to FIG. 1. The storage module 4400 may operate identically to the storage device 50 described with reference to FIG. 1.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

Only a few examples or embodiments of the disclosed technology are described. Variations or improvements of the disclosed examples or embodiments and other embodiments are possible based on what is disclosed.

What is claimed is:

1. A host device configured to control operations of a storage device that includes a replay protected memory block (RPMB), the host device comprising:

a host message authentication code (MAC) calculator configured to calculate a host MAC using host metadata; and a host PIU generator configured to: provide the storage device with a command protocol information unit (PIU) instructing the storage device to access the RPMB; and, after providing the command PIU, provide the storage device with a PIU including data to be stored in the RPMB, wherein the command PIU comprises a basic header segment and an extra header segment, wherein the basic header segment includes information indicating a type of a PIU and an initiator ID that identifies the host that generated the command PIU, wherein the extra header segment includes the host MAC and the host metadata, and wherein the basic header segment of the command PIU includes a total extra header segment length field indicating the command PIU includes the extra header segment including the host MAC and the host metadata.

2. The host device of claim 1, further comprising:
an authentication key storage configured to store an authentication key used for generating the host MAC.

3. The host device of claim 2, wherein the host MAC calculator calculates the host MAC using the host metadata and the authentication key.

4. The host device of claim 1, wherein the command PIU further comprises a transaction specific field configured to identify the type of the PIU transferred between the host device and the storage device.

5. The host device of claim 1, wherein the total extra header segment length field has a value other than 0.

6. The host device of claim 1, wherein the host PIU generator receives a response PIU from the storage device, and the response PIU comprises a basic header segment including a total extra header segment length field having a value other than 0 and an extra header segment including a device RPMB message.

7. The host device of claim 6, wherein the response PIU further comprises a transaction specific field identifying the type of the PIU transferred between the host device and the storage device.

8. The host device of claim 6, wherein the device RPMB message includes a device MAC and device metadata.

9. The host device of claim 8, wherein the device MAC is generated by the storage device using the device metadata.

10. The host device of claim 8, wherein the device metadata includes a result code indicating a result of accessing the RPMB by the command PIU.

11. The host device of claim 8, wherein the device metadata includes a write count value indicating the number of write operations performed on the RPMB.

12. An electronic device comprising:
a storage device comprising a replay protected memory block (RPMB); and
a host device configured to provide the storage device with a command protocol information unit (PIU) instructing the storage device to: access the RPMB; and, after providing the command PIU, provide the storage device with a PIU including data to be stored in the RPMB, wherein the command PIU comprises a basic header segment and an extra header segment, wherein the basic header segment includes information indicating a type of a PIU and an initiator ID that identifies the host that generated the command PIU, wherein the extra header segment includes a host RPMB message, and wherein the basic header segment of the command PIU includes a total extra header segment length field indicating the command PIU includes the extra header segment including the host MAC and the host metadata.

13. The electronic device of claim 12, wherein the RPMB comprises:

an authentication key storage configured to store a device authentication key used for authentication for the RPMB;

a write counter configured to store a write count value indicating the number of times an authenticated data write operation of storing data in the RPMB is successfully performed;

a result register configured to store a performance result of an operation on the RPMB; and an RPMB data area storing write data received from the host device.

14. The electronic device of claim 13, wherein the storage device comprises:

an authentication manager configured to perform the authentication and output a result of the authentication; and an access controller configured to control the RPMB based on the result of the authentication, and the host RPMB message includes a host message authentication code (MAC) and host metadata.

15. The electronic device of claim 14, wherein the authentication manager comprises:

a device MAC calculator configured to generate a device MAC using the host metadata and the device authentication key; and a MAC comparator configured to generate the result of the authentication according to whether the host MAC and the device MAC match.

16. The electronic device of claim 15, wherein the device MAC calculator generates the device MAC using a secure hash algorithm-256 (SHA-256) based on the host metadata and the device authentication key.

17. The electronic device of claim 14, wherein the host device comprises:

a host MAC calculator configured to calculate the host MAC using the host metadata;

a host PIU generator configured to generate the command PIU; and an authentication key storage configured to store a host authentication key used for generating the host MAC.

18. The electronic device of claim 17, wherein the host MAC calculator calculates the host MAC using the host metadata and the host authentication key.

19. The electronic device of claim 12, wherein the command PIU further comprises a transaction specific field identifying a type of a PIU transferred between the host device and the storage device, and the total extra header segment length field has a value other than 0.

20. The electronic device of claim 12, wherein the host device receives a response PIU from the storage device, and the response PIU comprises a basic header segment including a total extra header segment length field having a value other than 0 and an extra header segment including a device RPMB message.

21. The electronic device of claim 20, wherein the device RPMB message includes a device MAC and device metadata.

22. The electronic device of claim 21, wherein the device MAC is generated by the storage device using the device metadata.

23. The electronic device of claim 21, wherein the device metadata includes a result code indicating a result of accessing the RPMB by the command PIU.

24. The electronic device of claim 21, wherein the device metadata includes a write count value indicating the number of write operations performed on the RPMB.

* * * * *